(12) United States Patent
Liu

(10) Patent No.: US 10,323,622 B2
(45) Date of Patent: Jun. 18, 2019

(54) BI-DIRECTIONAL CONTRA-ROTATING CIRCULAR RAIL BEARING Y-SHAPED COMPOUND BLADE FLUID ENERGY COLLECTION MULTI-UNIT POWER GENERATING WINDMILL

(71) Applicants: Hailong Liu, Baoding, Hebei Province (CN); Wei Zhan, Shijiazhuang, Hebei Province (CN)

(72) Inventor: Hailong Liu, Baoding, Hebei Province (CN)

(73) Assignees: Hailong Liu, Baoding (CN); Wei Zhan, Shijiazhuang (CN)

( * ) Notice: Subject to any disclaimer, the term of this patent is extended or adjusted under 35 U.S.C. 154(b) by 352 days.

(21) Appl. No.: 15/124,735

(22) PCT Filed: Jan. 26, 2015

(86) PCT No.: PCT/CN2015/000041
§ 371 (c)(1),
(2) Date: Sep. 9, 2016

(87) PCT Pub. No.: WO2015/135373
PCT Pub. Date: Sep. 17, 2015

(65) Prior Publication Data
US 2017/0022971 A1   Jan. 26, 2017

(30) Foreign Application Priority Data

Mar. 10, 2014 (CN) .......................... 2014 1 0083676

(51) Int. Cl.
*F03D 5/04* (2006.01)
*F03D 9/32* (2016.01)
(Continued)

(52) U.S. Cl.
CPC ............... *F03D 5/04* (2013.01); *F03D 3/061* (2013.01); *F03D 7/042* (2013.01); *F03D 9/10* (2016.05);
(Continued)

(58) Field of Classification Search
CPC ..... F03D 5/04; F03D 9/10; F03D 9/32; F03D 15/10; F03D 80/70; F03D 3/061;
(Continued)

(56) References Cited

U.S. PATENT DOCUMENTS 1,046,026 A     12/1912  Salisbury
3,504,988 A  *   4/1970  Stenner ..................... F03D 5/04
                                                        416/156
(Continued)

FOREIGN PATENT DOCUMENTS

CN      201972857       9/2011
CN      202468158      10/2012
(Continued)

*Primary Examiner* — Nathaniel E Wiehe
*Assistant Examiner* — Emily S Adelman
(74) *Attorney, Agent, or Firm* — Bay State IP, LLC

(57) ABSTRACT

A bi-directional contra-rotating circular rail bearing Y-shaped compound blade fluid energy collection multi-unit power generating windmill, the windmill comprising: a windmill remote automatic control system (1); a Y-shaped compound blade (2) from a combining of single blades; a circular rail windmill body (3) bearing the Y-shaped compound blade (2); a circular windmill rail (4) bearing the circular rail windmill body (3) for operation; a circular rail connection cable pulling vehicle (5) running on the circular cable pulling vehicle rail to pull the circular rail windmill using a stay cable (209); a hydraulic energy collection multi-unit power generating system (6) or pneumatic energy collection multi-unit power generating system (7); the Y-shaped compound blade (2) is born by three circles of the (Continued)

circular rail windmill body (3) arranged equidistant thereon; the circular rail windmill body (3) has six circles.

15 Claims, 21 Drawing Sheets

(51) Int. Cl.

| | | |
|---|---|---|
| *F03D 15/10* | (2016.01) | |
| *F03D 3/06* | (2006.01) | |
| *F03D 9/10* | (2016.01) | |
| *F03D 80/70* | (2016.01) | |
| *F03D 7/04* | (2006.01) | |

(52) U.S. Cl.
CPC ............... *F03D 9/32* (2016.05); *F03D 15/10* (2016.05); *F03D 80/70* (2016.05); *Y02E 10/70* (2013.01); *Y02E 10/728* (2013.01); *Y02E 10/74* (2013.01)

(58) Field of Classification Search
CPC ... F03D 7/042; F03D 9/11; F03D 9/30; Y02E 10/70; Y02E 10/74
USPC .................................................. 415/4.1, 4.2
See application file for complete search history.

(56) References Cited

U.S. PATENT DOCUMENTS

| | | | | |
|---|---|---|---|---|
| 7,453,166 | B2 * | 11/2008 | Power, III | ................. F03D 5/04 |
| | | | | 290/43 |
| 7,750,491 | B2 * | 7/2010 | Sankrithi | .............. F03B 13/264 |
| | | | | 290/43 |
| 2012/0211987 | A1 * | 8/2012 | Roe | ......................... F03B 13/16 |
| | | | | 290/53 |

FOREIGN PATENT DOCUMENTS

| | | |
|---|---|---|
| CN | 103807107 | 5/2014 |
| EP | 2078853 | 7/2009 |

\* cited by examiner

BI-DIRECTIONAL CONTRA-ROTATING CIRCULAR RAIL BEARING Y-SHAPED COMPOUND BLADE FLUID ENERGY COLLECTION MULTI-UNIT POWER GENERATING WINDMILL

CROSS REFERENCE TO RELATED APPLICATION

This application is for entry into the U.S. National Phase under § 371 for International Application No. PCT/CN2015/000041 having an international filing date of Jan. 26, 2015, and from which priority is claimed under all applicable sections of Title 35 of the United States Code including, but not limited to, Sections 120, 363, and 365(c), and which in turn claims priority under 35 USC 119 to Chinese Patent Application No. 201410083676.1 filed on Mar. 10, 2014.

TECHNICAL FIELD

The present invention belongs to a new technology utilizing renewable clean energy (i.e., wind energy) and relates to a ultrahigh-power power generating windmill, which is characterized by an innovative circular-rail bearing compound blade device, with large windmill diameter and high blade solidity ratio; and characterized in that hydraulic or pneumatic energy collection multi-unit power generating systems generate much electric energy and can efficiently utilize wind energy in large scale.

BACKGROUND OF THE PRESENT INVENTION

Power generating windmills in the past are single-tower windmills having small standalone power generation capacity and low power generation efficiency, and mainly have the following technical problems: first, although much electricity may be generated by increasing the windmill diameter to scale, the weight of the windmill and the generator will be greatly increased, and the service life will be reduced due to the fatigue resulted from the increase of bearing loads, and accordingly, the diameter of an existing maximum wind-driven generator blade will not exceed 200 m; second, by the improvement of the solidity ratio of the windmill blades, a same swept area has a larger wind catch area so that much electricity can be generated, while the solidity ratio of a conventional windmill blade is between 5% and 20%, resulting in the waste of wind resource; and third, the rated wind speed is improved and the most effective (i.e., full-load) power generation time is increased, while the cut-off wind speed of the conventional windmill is generally 25 m/s, and the magnitude of wind energy is in direct proportion to the third power of the wind speed, in other words, only energy at a low wind speed is utilized and considerable wind energy at a high wind speed has to be abandoned. The bi-directional contra-rotating circular-rail bearing Y-shaped compound blade fluid energy collection multi-unit power generating windmill provided by the present invention may overcome these technical problems.

SUMMARY OF THE PRESENT INVENTION

An objective of the present invention is to provide an ultra-large wind power station which can make full use of the wind resource and can be built at a low cost. The bi-directional contra-rotating circular-rail bearing Y-shaped compound blade fluid energy collection multi-unit power generating windmill provided by the present invention may solve "three technical problems" of conventional wind-driven power generation: "compound blade circular-rail bearing" makes the swept diameter of the windmill reach above 3000 m; the design of "bi-directional contra-rotation and compound blades" makes the solidity ratio of the windmill blades reach 100%; and, the design of "individual blade rotation wind-orientation in combination with compound blade revolution" may improve the wind-receiving operation effects of blades. Since the blades of the windmill have a maximum tangential speed not exceeding the wind speed and a maximum tip speed ratio of 1, the blades can operate in strong wind. Hydraulic or pneumatic energy collection multi-unit power generating systems allow the windmill to have large installed capacity, good quality of output electric energy and low construction cost. The power generating windmill may be larger and higher, depending upon the design requirements. Given that the diameter of the windmill is 3000 m and the height thereof is 150 m, the cross-sectional swept area is 3000×150=450000 m², the blade area is 450000×13=5850000 m², and the capacity of the generator set can reach above several millions of kilowatts.

To solve the technical problems, the present invention employs the following technical solutions.

The bi-directional contra-rotating circular-rail bearing Y-shaped compound blade fluid energy collection multi-unit power generating windmill includes a remote automatic windmill control system (1), Y-shaped compound blades (2) formed by individual blades, a circular-rail windmill body (3) bearing the compound blades, a circular windmill rail (4) bearing the circular-rail windmill body for running, circular-rail one-piece cable pulling vehicles (5) running on a circular cable pulling vehicle rail to pull a circular-rail windmill using a stay cable (209), and hydraulic energy collection multi-unit power generating systems (6) or pneumatic energy collection multi-unit power generating systems (7), wherein the Y-shaped compound blades (2) are borne by three circles of the circular-rail windmill body (3) and are arranged successively and equidistantly on the circular-rail windmill body (3); the circular-rail windmill body (3) has six circles, and the opening angle of the Y-shaped compound blades (2) borne by three inner circles of the circular-rail windmill body (3) is opposite to the opening angle of the Y-shaped compound blades (2) borne by three outer circles of the circular-rail windmill body (3) so that the bi-direction contra-rotation of the circular-rail windmill is realized; and, there are four circles of the circular cable pulling vehicle rail, the circular-rail one-piece cable pulling vehicles (5) run on the circular cable pulling vehicle rail, and in every two circles, the circular-rail one-piece cable pulling vehicles (5) are connected with the Y-shaped compound blades (2) in the middle via the stay cable (209).

The present invention provides "circular-rail bearing Y-shaped compound blades". Each of the Y-shaped compound blades (2) includes a middle compound blade surface (20301) and left and right side compound blade surfaces (20302), the three surfaces having an included angle of 120 degrees, being equal in length and being in a Y shape when viewed from the top; side forward-leaned compound blade surfaces (20303) which are leaned forward by 45 degrees are mounted on the tops of the side compound blade surfaces (20302); and, the compound blade surfaces are changed to be leaned forward by 45 degrees from being vertical to the ground, so that the compound blade surfaces when facing the wind exert a certain upward lift force to the forward-leaned blade surfaces in the aid of wind force, and the stress at the root of the mast (201) is thus reduced. Each of the compound blade surfaces of the Y-shaped compound blades (2) is formed by a grid framework (204), individual blades and a mast; the grid framework (204) is formed by a plurality of grids distributed in both the horizontal direction and the vertical direction, so that the blades can be expanded flexibly. The Y-shaped compound blades (2) are equidistantly arranged on the circular windmill body (3), and the windmill diameter is not limited and may be up to above 3000 m. The preset invention provides two fluid energy collection power generation methods. The hydraulic energy collection multi-unit power generating systems (6) use water as a medium in an energy conversion, transfer and circulation system, and are suitable for areas which are ice-free throughout the year; while the pneumatic energy collection multi-unit power generating systems (7) use air as a medium in the energy conversion, transfer and circulation system and are suitable for extremely cold areas.

The hydraulic energy collection multi-unit power generating systems (6) are mounted between the three inner circles and the three outer circles of the circular-rail windmill, and each equidistantly and circumferentially distributed on one side of the circular-rail windmill rail; each hydraulic energy collection multi-unit power generating system (6) includes a reversible hydraulic pump (601), a hydraulic pump water inlet pipe (602), a hydraulic pump water outlet pipe (603), a main water return pipe (609), a main water supply pipe (605), a water pipe valve (607), a high-pressure pneumatic water tank (613), an air compressor (612), a circulating water pool (609), a liquid feed pump (608) and a water wheel generator set (616), wherein the water wheel generator set (616) is connected with multiple intelligent combinations in series and in parallel, the motor water pipe valve (619) is controlled to be turned on by the remote automatic windmill control system (1) to allow a high-pressure water flow to quickly rush to water wheel generators so that the water wheel generator set (616) accomplishes different power output processes in accordance with different combinations; the water wheel generator set (616) is connected between the motor water outlet pipe (618) and the motor water inlet pipe (614), and pressure relief and water return devices, i.e., a return pipe and an one-way automatic control valve (615), are connected with the generator set in parallel; and, when the generator set performs load rejection, the high-pressure water flow may be divided at the water wheel generators and then a part of the high-pressure water flow flows through the return pipe.

The pneumatic energy collection multi-unit power generating systems (7) are mounted between the three inner circles and the three outer circles of the circular-rail windmill and equidistantly and circumferentially distributed on one side of the circular-rail windmill rail; each pneumatic energy collection multi-unit power generating system (7) includes a reversible pneumatic pump (701), a pneumatic adjustment valve (702), a main gas supply pipe (703), a main gas return pipe (704), a pneumatic pump gas inlet pipe (705), a gas pump gas outlet pipe (706), a gas pipe valve (707), a gas wheel generator set (709), a motor gas inlet pipe (710), a motor gas outlet pipe (711), a low-pressure gas tank (712), a high-pressure gas tank (713) and a motor gas pipe valve (714); and, the gas wheel generator set (709) is connected with multiple intelligent combinations in series and in parallel and can accomplish different power output processes of the generators.

The relation and operation conditions of the blade transmission systems will be explained below.

The revolution of the circular-rail windmill body (3) is combined with the rotation of individual blades. The rotation of the individual blades is a continuous circular movement of the individual blades relative to the central axis of a blade rotation shaft (21202), and the windmill revolution means that the compound blades drive the circular-rail windmill body (3) to continuously do circular movement along the circular rail.

As shown in FIG. 2, the blade angle, stress condition and motion performance of the windmill blades at several key positions in the case where the rotation of blades is combined with the revolution will be specifically described. In this drawing, it is assumed that the Y-shaped compound blades (2) borne by three inner circles of circular-rail revolve clockwise, the Y-shaped compound blades (2) borne by three outer circles of circular-rail revolve counterclockwise. The thick arrows indicate the wind direction.

For the Y-shaped compound blades (2) borne by three inner circles of circular-rail that run clockwise, in the time span from 7:00 to 11:00, the blade surfaces of the individual blades cover the grid framework (204) of the compound blade surfaces in parallel, so that the flat surfaces of the compound blade surfaces become a wind-tight wall, a stress is formed and the windmill is thus urged to rotate under the stress.

The plane of two side compound blade surfaces (20302) and a previous middle compound blade surface (20301) forms two V-shaped wind collection openings which have an included angle of 60 degrees, and the spacing between the included angle and the previous middle compound blade surface (20301) is ⅓ of the length of the middle compound blade surface (20301), with a gap reserved. By this design, the wind collection openings operate for the first time, and the airflow passes and then urges the other blade surface to operate. In this way, the efficiency of the windmill is improved.

As the wind-receiving angles of the flat surfaces of the compound blade surfaces are different, the time spans for generating the revolution effect are also different. As shown in FIG. 2, when the wind blows from south to north and when three inner circles of compound blades revolve clockwise, the revolution effect may be generated when the flat surface of the middle compound blade surface (20301) operates in the time span from 7:00 to 11:00, the flat surface of the inside compound blade surface (20302) operates in the time span from 5:00 to 11:00 and the flat surface of the outside compound blade surface (20302) operates in the time span from 7:00 to 1:00. In this time span, the blade surfaces of individual blades are tiled on the grid framework (204) of the flat surfaces of the compound blade surfaces and stay still. However, in other spans in which the flat surfaces of the compound blade surfaces cannot generate the revolution effect, the individual blades are driven to rotate by an individual blade wind-tracing direction adjustment device to adjust the wind-receiving angles of the blade surfaces so as to achieve an optimal wind-receiving angle and an optimal wind-receiving area, and to continue to generate the revolution effect.

The direction of wind determines optimal wind-receiving angles of blade surfaces of individual blades in each time span. When the compound blades operate to time spans in which the flat surfaces of compound blade surfaces of the compound blades cannot generate the revolution effect, the remote automatic windmill control system (1) controls the individual blade wind-tracing direction adjustment device to allow the individual blades to rotate so as to adjust the individual blades to the respective optimal wind-receiving angles and then allow the individual blades to rotate in an opposite direction at a rotation speed ratio of 1:2 with the revolution of the windmill. Since the individual blades rotate in an opposite direction at a rotation speed ratio of 1:2 with the revolution of the windmill, it is advantageous for the individual blades to always remain at the optimal wind-receiving angle in the span and generate the revolution effect. As shown in FIG. 2, when the wind blows from south to north, when three inner circles compound blades revolve clockwise, and when the compound blades revolve by 120 degrees from 11:00 to 3:00 (an upwind side), a tangential angle of the individual blade surfaces and the revolution circumference is reduced from 60 degrees to 0 degree, and the individual blades rotate by 60 degrees at a rotation speed ratio of 1:2. When the compound blades revolve by 120 degrees from 3:00 (an upwind side) to 7:00, the tangential angle of the individual blade surfaces and the revolution circumference is increased from 0 degree to 60 degrees, and the individual blades rotate by 60 degrees at a rotation speed ratio of 1:2. Due to the tangential angle of the individual blades and the revolution circumference, the individual blades generate a component of force which is advantageous for their tangential movement along the revolution circumference. When the individual blades operate to a time span from 11:00 to 3:00, the component of force becomes smaller. At 3:00 (an upwind side), the tangential angles of all the individual blade surfaces and the revolution circumference are 0 degrees, the individual blade surfaces are parallel to the wind direction, the component of force is 0, and a minimum wind-receiving area is resulted. When the individual blades operate to a time span from 3:00 to 7:00, the component of force becomes larger, so that the individual blades generate the revolution effect. In conclusion, by wind-tracing by the revolution of the flat surfaces of the compound blade surfaces and the rotation of the individual blade surfaces, the blades have excellent wind-receiving operation performances in the spans.

As the strong wind will exert a very strong force to the windmill, the circular-rail power generating windmill can flexibly adjust the wind-receiving area of blades and can operate in the strong wind. Specifically, the compound blades are formed by several layers of individual blades, and the rotation speed ratio of the rotation of each layer of individual blades may be adjusted by the individual blade wind-tracing direction adjustment device. In case of strong wind, when the compound blades operate to an upwind side, the blade surfaces of the individual blades are parallel to the wind direction; by the individual blade wind-tracing direction adjustment device, the ratio of the rotation speed of the rotation of higher layers of individual blades to the revolution speed of the windmill is adjusted to be 1:1, and since the rotation directions are opposite, the blade surfaces of higher layers of individual blades are always parallel to the wind direction and withstand the wind at a minimum area. If the wind becomes stronger, a larger number of upper layers of individual blades will be adjusted to withstand wind at the minimum area. When only the lowest layer of individual blades operate against wind, the wind-receiving area of the blade surfaces will be reduced to one-tenths of the normal wind-receiving area. The individual blades in a lower layer have a firmer structure and can better withstand strong wind, and thus the individual blades can operate in ultra-strong wind. If the blade surfaces of all the individual blades are caused to be parallel to the wind direction, the windmill stops operating to withstand the ultra-strong wind.

The remote automatic windmill control system (1) provided by the present invention is mainly consisted of an information core component, information collection and sensing components, and an information command execution component; the information core component is a computer in which all management programs of the whole windmill operate, the computer can send an execution command or a command of accessing and collecting related information to interface circuits of all information components by using the windmill management programs, and an information interface of the computer is also connected to an external network in order to share internal and external information resources and perform remote uniform management; the information collection and sensing components are information sources of the computer; various information collection and sensing components can measure wind direction, wind speed, temperature, motor rotation speed and power, the rotation angle of each layer of individual blades, the relative orientation of each circle of the circular-rail windmill body (3) and the circular windmill rail (4) when the windmill performs revolution, and the relative orientation of the circular-rail one-piece cable pulling vehicles (5) and the circular-rail windmill; these information sensing components provide useful data for the computer constantly; and each information sensing component has an information processing circuit with a certain ability and a set of complete information interface circuits; the information command execution component mainly involves: clutch switching-on/off and transmission ratio control of the variable-speed regulation motor device (21110) in the wind-tracing direction adjustment device mounted between the individual blades, startup or turning-off of the servo motor, connection or disconnection of the clutch device (407) mounted on the vertical shaft (406), on/off of valves of the reversible hydraulic pumps (601) with the hydraulic pump water inlet pipe (602) and the hydraulic pump water outlet pipe (603), on/off of the gas pipe valve (707) of the reversible pneumatic pumps (701) with the pneumatic pump gas inlet pipe (705) and the pneumatic pump gas outlet pipe (706), adjustment of the total number of the reversible hydraulic pumps/pneumatic pumps operating in parallel, connection of multiple intelligent combinations to the water/gas wheel generator set in series and in parallel, adjustment of power output processes of the generators, operation of the circular-rail one-piece cable pulling vehicles (5), adjustment of the driving force transferred to the side driving gear (508) by the hydraulic motor and the servo motor and the transmission ratio, and adjustment of connection at the controllable moving joints of the circular-rail one-piece cable pulling vehicles (5); for various action executions, a large amount of facilities such as electronic switches, electromagnetic switches and servo motors are utilized, which are extensions of the "hand" of the computer; and the three information facilities, i.e., the information core, information sensing and information execution components, form the automated hardware environment required for the operation of the windmill; the windmill management program software environment runs in the computer and is divided into five subprograms: a self-check program of the windmill, a startup wind collection and reset program of the windmill, a multi-circumstance wind collection program of the windmill, a wind collection stopping program of the windmill and a fault-protection stopping program of the windmill; as long as the conditions for entering a certain subprogram are met, the computer can enter the running state of this program; and, the whole management of the windmill is a process in which the five subprograms are flexibly switched and operated according to respective multiple conditions and setup parameters.

The bi-directional contra-rotating circular-rail bearing Y-shaped compound blade fluid energy collection multi-unit power generating windmill provided by the present invention has the following prominent beneficial effects:

1. the Y-shaped compound blades borne by the circular rail operate stably, and the compound blades may be designed to be larger or smaller;

2. the inner and outer circles of the windmill body are contra-rotated on the circular-rail in both directions, the highest tip speed ratio is 1, and the radius is super long so that a smaller angular speed is still kept after the windmill body rotates at a high speed, and the windmill body may operate in strong wind;

3. The hydraulic or pneumatic energy collection multi-unit power generating systems (7) allow the windmill to have large installed capacity, good quality of output electric energy and low construction cost;

4. the design in which the individual blade wind-tracing direction adjustment device rotates by 360° can safely cope with the strongest wind, and because the blade surfaces are made of cloth, the blades have light weight, low manufacture cost, free of damage by bird strikes, and environment protection; and 5. the windmill blades are particularly suitable for the construction of an ultra-large wind power station, due to their high solidity ratio, large wind collection area so that they may be driven by gentle wind, large working wind speed range, low cost and high efficiency.

BRIEF DESCRIPTION OF THE DRAWINGS

FIG. 3-1 is a structural diagram of an individual Y-shaped compound blade;

FIG. 3-2 is a structural diagram of a middle blade surface of the Y-shaped compound blade;

FIG. 3-3 is a structural diagram of side blade surfaces of the Y-shaped compound blade;

FIG. 3-4 is a structural diagram of a grid framework of the Y-shaped compound blade;

FIG. 3-5 is a structural diagram of a rope net of the Y-shaped compound blade;

FIG. 3-6 is a structural diagram of a stay cable of the Y-shaped compound blade;

FIG. 4-1 is a stereoscopically structural diagram of individual blades rotating around a mast, after intersection regions of the horizontal lines B, C and the vertical lines F, H in FIG. 3-3 are enlarged;

FIG. 4-2 is a structural side view of individual blades rotating around the mast;

FIG. 4-3 is a structural front view of individual blades rotating around the mast;

FIG. 4-4 is a stereoscopically structural diagram of individual blades fixed on a rotation shaft, after intersection regions of the horizontal lines B, C and the vertical lines D, E in FIG. 3-3 are enlarged;

FIG. 4-5 is a structural side view of individual blades fixed on the rotation shaft;

FIG. 4-6 is a structural front view of individual blades fixed on the rotation shaft;

FIG. 4-7 is a stereoscopically structural diagram of individual triangular blades;

FIG. 4-8 is a top view of the individual triangular blades;

FIG. 4-9 is a stereoscopically structural diagram of individual polygonal blades, after intersection regions of the horizontal lines A, B and the vertical lines G, I in FIG. 3-3 are enlarged;

FIG. 5-1 is a structural top view of a part of a windmill having three circles of circular rails, where the Y-shaped compound blades are removed off side forward-leaned compound blade surfaces;

FIG. 5-2 is a structural top view of a part of a windmill having three circles of circular rail at controllable telescopic moving joints, where the Y-shaped compound blades are removed off side forward-leaned compound blade surfaces;

FIG. 6 is a schematic diagram of hydraulic energy collection multi-unit power generating systems;

FIG. 7 is a schematic diagram of pneumatic energy collection multi-unit power generating systems;

FIG. 8-1 is a stereoscopically structural diagram of a circular-rail windmill body;

FIG. 8-2 is a stereoscopically structural diagram of a circular windmill rail;

FIG. 8-3 is a stereoscopically structural diagram after the circular windmill rail and the circular-rail windmill body are combined; and FIG. 9 is a stereoscopically structural diagram of circular-rail one-piece cable pulling vehicles, in which:

Figure 1:
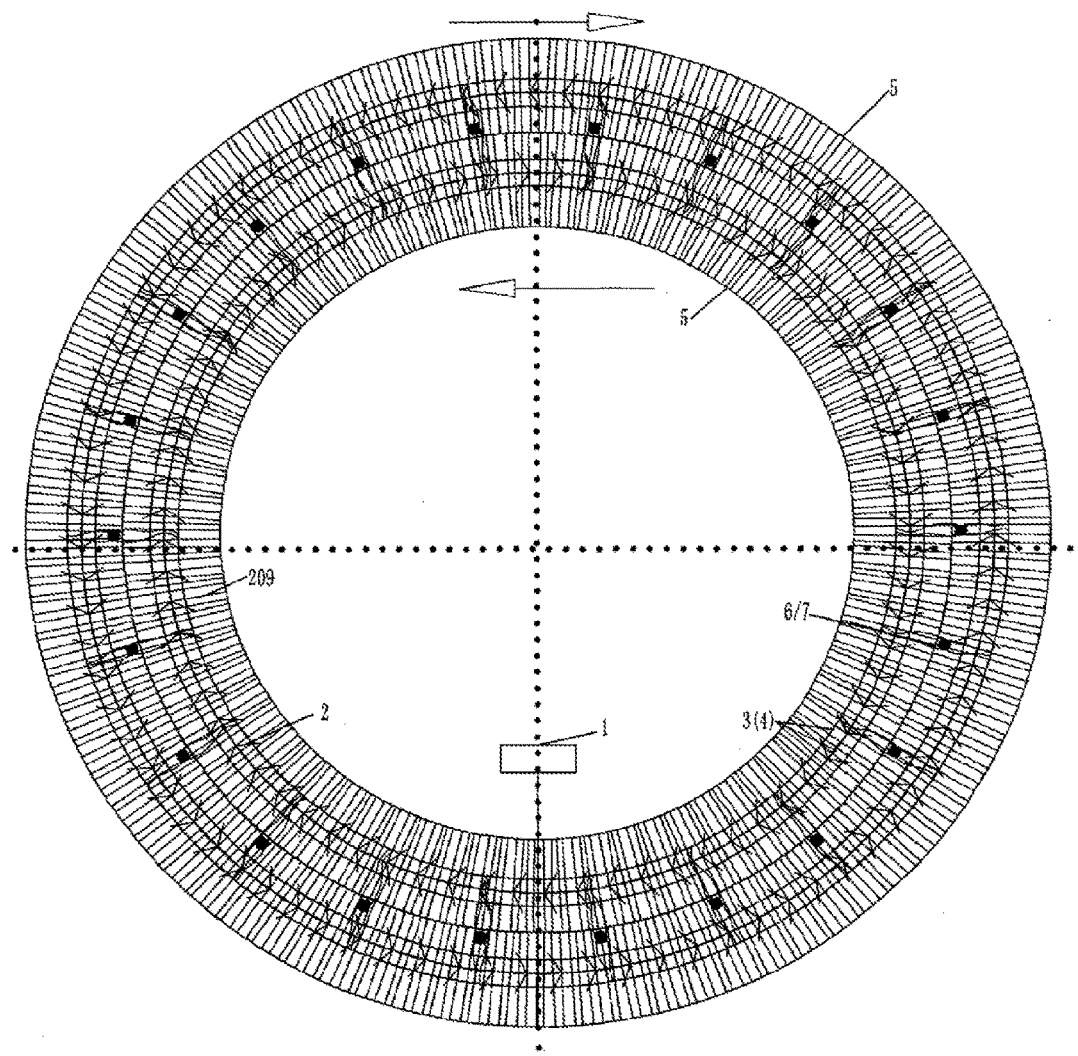
FIG. 1 is an overall top view of a windmill according to the present invention.

1: remote automatic windmill control system; 2: Y-shaped compound blade; 201: mast; 201-1: mast; 201-2: mast; 201-3: mast; 201-4: mast; 201-5; mast; 201-6: mast; 201-7: bevel mast leaded forward by 45 degrees; 202: side mast; 202-1: side mast; 202-2: side mast; 202-3: side mast; 202-4: side mast; 202-5: side mast; 202-6: side mast; 202-7: side mast; 202-8: side mast; 202-9: side mast; 20301: middle compound blade surface; 20302: side compound blade surface; 20303: forward-leaned compound blade surface; 204: grid framework; 205: grid framework support frame; 20501: bevel support rod; 20502: support pillar; 20503: transverse connecting rod; 20504: longitudinal connecting rod; 206: rope net; 207: horizontal support pillar; 208: straight pulling cable; 209: stay cable; 210: cross rod; 211: rhombic individual blade rotating about the mast left and right; 21101: blade surface; 21102: individual blade bearing on the mast; 21103: individual blade support lever; 21104: individual blade border; 21105: blade reinforcing rope; 21106: individual blade support pillar; 21107: traction rope; 21108: individual blade rotating-about mast gear; 21109: annular transmission chain; 21110: variable-speed regulation motor device; 212: rhombic individual blade which is fixed on a rotation shaft and can rotate by 360 degrees left and right; 21201: blade surface; 21202: blade rotation shaft; 21203: individual blade support lever; 21204: individual blade border; 21205: blade reinforcing rope; 21206: individual blade support pillar; 21207: individual blade traction rope; 21208: individual blade rotation shaft gear; 213: triangular individual blade; 21301: blade surface; 21302: individual blade rotation shaft; 21303: blade support lever; 21304: individual blade border; 21305: power traction rope; 21306: rolling wheel; 21307: pulley on a triangular framework; 21401: pentagonal individual blade rotating about the mast; 21405: pentagonal individual blade which is fixed on a rotation shaft and can rotate by 360 degrees left and right; 215: horizontal support framework; 216: polygonal one-piece blade; 21601: blade surface; 21602: rotation shaft; 21603: power traction rope;

21604: individual blade border; 21605: rolling wheel; 21606: pulley; 21607: transmission wheel; 21608: traction rope in a horizontal rod; 217: individual blade coupling; 3: circular-rail windmill body; 301: windmill body side rail; 302: lower wheel; 303: upper wheel; 304: middle left wheel; 305: middle right wheel; 306: hydraulic pump; 307: pneumatic pump; 308: servo motor; 309: oil pipe; 311: pneumatic water tank; 312: gas tank; 4: circular windmill rail; 401: lower rail; 402: upper wheel groove; 403: middle wheel groove; 404: gear on a vertical shaft; 405: circular wheel; 406: vertical shaft; 407: clutch device; 5: circular-rail one-piece cable pulling vehicle; 501: lower rail; 502: upper wheel groove; 503: middle wheel groove; 504: cable pulling vehicle side rail; 505: upper support wheel; 506: lower support wheel; 507: horizontal support wheel; 508: side driving gear; 509: side auxiliary driving gear; 510: vertical shaft; 511: servo motor; 512: controllable variable-speed hydraulic motor; 6: hydraulic energy collection multi-unit power generating system; 601: reversible hydraulic pump; 602: hydraulic pump water inlet pipe; 603: hydraulic pump water outlet pipe; 604-1: main water pipe valve; 604-2: main water pipe valve; 604-3: main water pipe valve; 604-4: main water pipe valve; 604-5: main water pipe valve; 604-6: main water pipe valve; 604-7: main water pipe valve; 604-8: main water pipe valve; 605: main water supply pipe; 606: main water return pipe; 607: water pipe valve; 608: liquid geed pump; 609: circulating water pool; 610: pressure gas pipe; 611: gas valve; 612: air compressor; 613: high-pressure pneumatic water tank; 614: motor water inlet pipe; 615: one-way automatic control valve; 616: water wheel generator set; 617: cable; 618: motor water outlet pipe; 619: motor water pipe valve; 7: pneumatic energy collection multi-unit power generating system; 701: reversible pneumatic pump; 702: pneumatic adjustment valve; 703: main gas supply pipe; 704: main gas return pipe; 705: pneumatic pump gas inlet pipe; 706: pneumatic pump gas outlet pipe; 707: gas pipe valve; 708-1: main gas pipe valve; 708-2: main gas pipe valve; 708-3: main gas pipe valve; 708-4: main gas pipe valve; 708-5: main gas pipe valve; 708-6: main gas pipe valve; 708-7: main gas pipe valve; 708-8: main gas pipe valve; 709: gas wheel generator set; 710: motor gas inlet pipe; 711: motor gas outlet pipe; 712: low-pressure gas tank; 713: high-pressure gas tank; and, 714: motor gas pipe valve.

DETAILED DESCRIPTION OF THE PRESENT INVENTION

The present invention will be further described below with reference to the accompanying drawings and specific implementations, but the present invention is not limited to these implementations.

As shown in FIG. 1, the bi-directional contra-rotating circular-rail bearing Y-shaped compound blade fluid energy collection multi-unit power generating windmill includes a remote automatic windmill control system (1), Y-shaped compound blades (2) formed by individual blades, a circular-rail windmill body (3) bearing the Y-shaped compound blade (2), a circular windmill rail (4) bearing the circular-rail windmill body (3) for running, circular-rail one-piece cable pulling vehicles (5) running on a circular cable pulling vehicle rail to pull a circular-rail windmill using a stay cable (209), hydraulic energy collection multi-unit power generating systems (6) or pneumatic energy collection multi-unit power generating systems (7), wherein the Y-shaped compound blades (2) are borne by three circles of the circular-rail windmill body (3) and are arranged successively and equidistantly on the circular-rail windmill body (3); the circular-rail windmill body (3) has six circles, and the opening angle of the Y-shaped compound blades (2) borne by three inner circles of the circular-rail windmill body (3) is opposite to the opening angle of the Y-shaped compound blades (2) borne by three outer circles of the circular-rail windmill body (3) so that the bi-direction contra-rotation of the circular-rail windmill is realized; and, there are four circles of the circular cable pulling vehicle rail, the circular-rail one-piece cable pulling vehicles (5) run on the circular cable pulling vehicle rail, and in every two circles, the circular-rail one-piece cable pulling vehicles (5) are connected with the Y-shaped compound blades (2) in the middle via the stay cable (209).

Figures 1, 3:
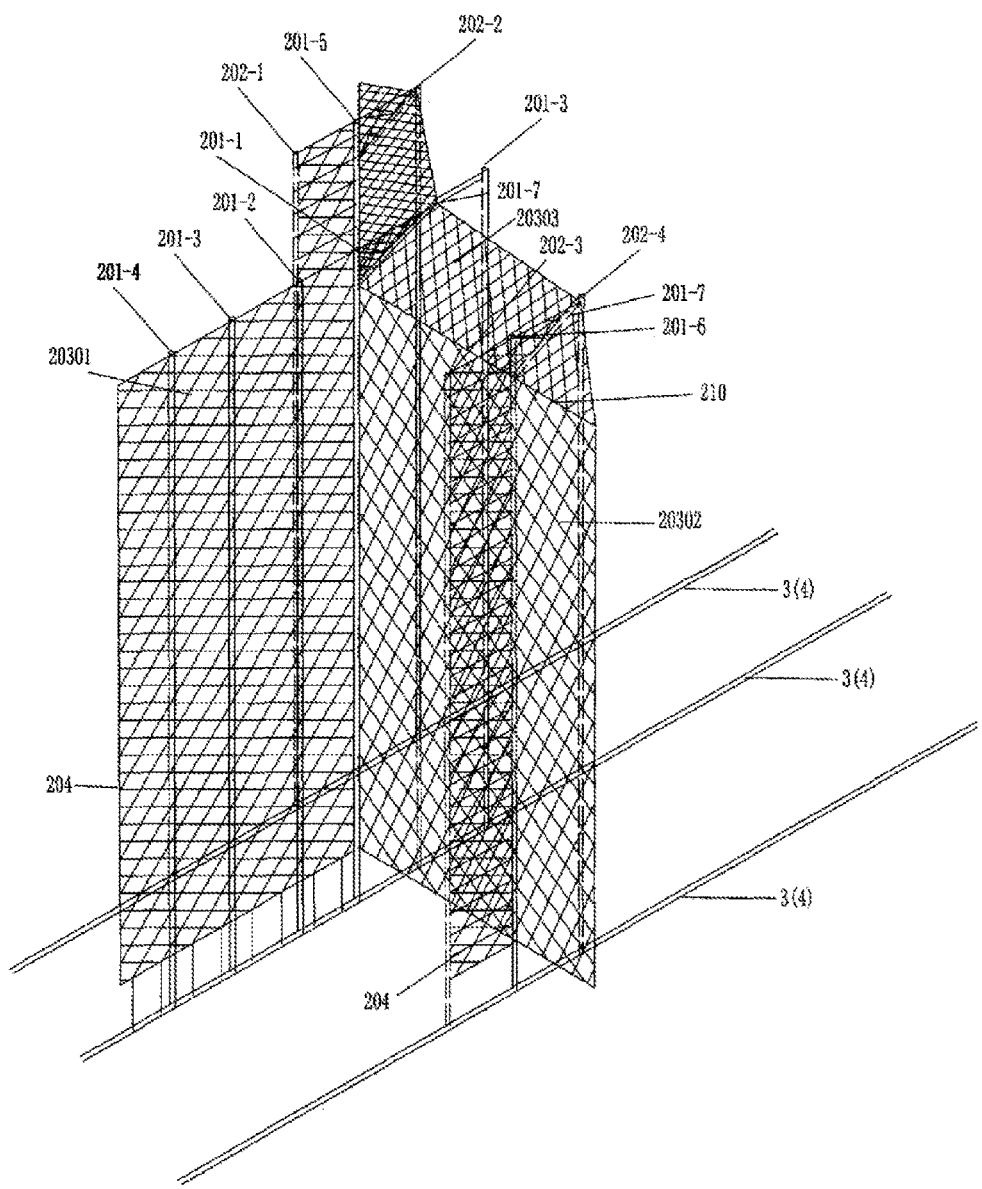
Figures 2, 3:
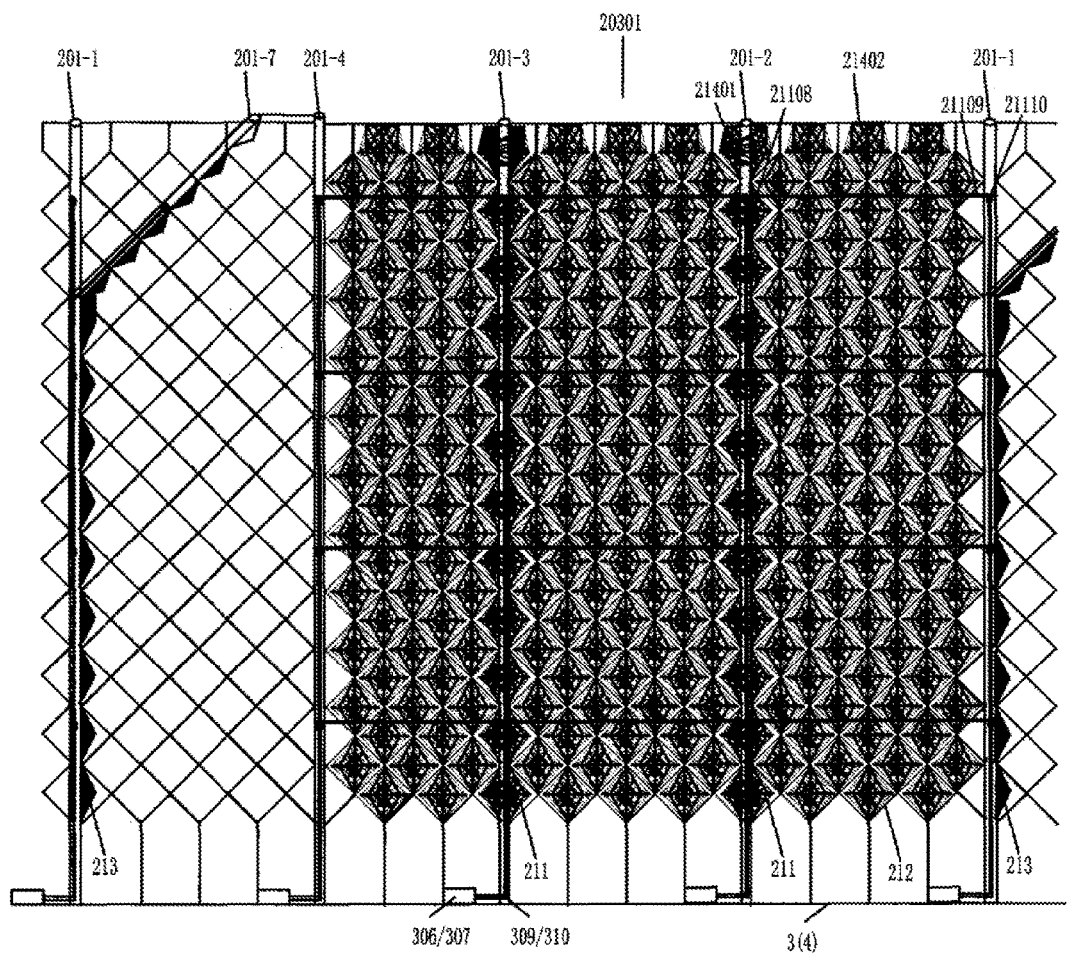
Figure 3:
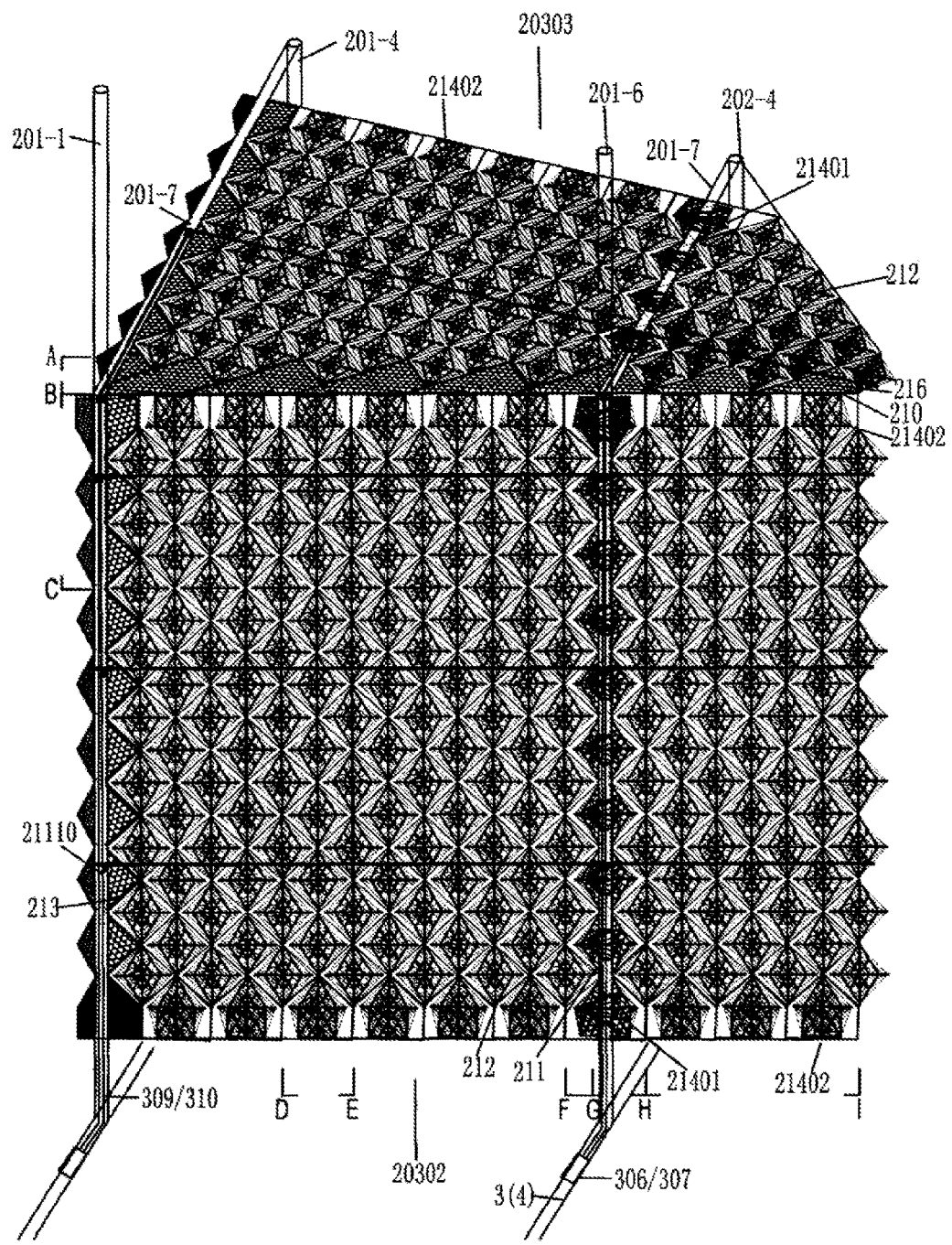

As shown in FIG. 3-1, each of the Y-shaped compound blades (2) comprises a middle compound blade surface (20301) and left and right side compound blade surfaces (20302), the three surfaces having an included angle of 120 degrees, being equal in length and being in a Y shape when viewed from the top; side forward-leaned compound blade surfaces (20303) which are leaned forward by 45 degrees are mounted on the tops of the side compound blade surfaces (20302); and, the compound blade surfaces are changed to be leaned forward by 45 degrees from being vertical to the ground, so that the compound blade surfaces form a certain upward lift force to the forward-leaned compound blade surfaces with the help wind force when facing the wind, and the stress at the roots of masts (201) and side masts (202) is thus reduced. The left compound blade surface (20302) is supported by a mast (201-5) on the left circular-rail windmill body (3), and two side masts (202-1, 202-1) in front and rear of the mast (201-5) are connected and supported through a grid framework (204). The right compound blade (20302) is supported by a mast (201-6) on the right circular-rail windmill body (3), and two side masts (202-3, 202-4) in front and rear of the mast (201-6) are connected and supported through the grid framework (204).

Figure 2:
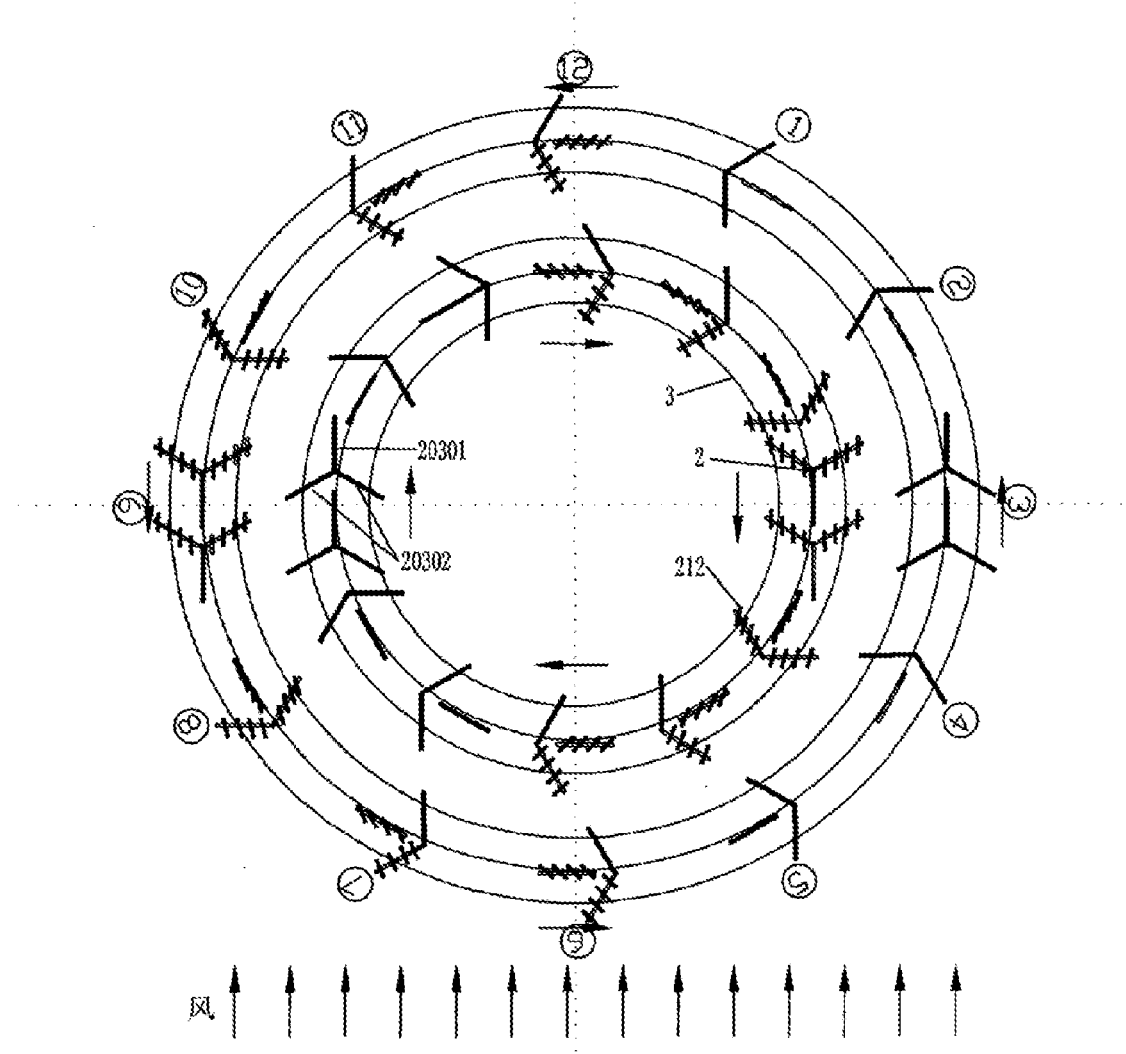
FIG. 2 is a top view of blade angles and stressed operations of windmill blades at several key positions.

With reference to FIGS. 3-1, 3-2 and 3-3, each of the three surfaces of the Y-shaped compound blades (2) is formed by a grid framework (204), individual blades and a mast. The grid framework (204) is formed by a plurality of grids distributed in both the horizontal direction and the vertical direction. Rhombic individual blades (212) which are fixed on a rotation shaft and can rotate by 360 degrees left and right about the masts are mounted in rhombic grid frameworks on the masts (201-2, 201-3, 201-4, 201-5, 201-6). A pair of individual triangular blades (213) is mounted in left and right triangular grid frameworks of the mast (201-1, and the paired individual triangular blades (213) and the mast are rotatably connected between the left and right triangular grid frameworks and can rotate by 120 degrees. A transverse distance of the connection points of the left and with triangular grid frameworks and the mast (201-1) is greater 0.17 times that of the rotation radius of the rhombic individual blades, so that the first rows of rhombic individual blades on the left and right of the mast (201-1) do not contact with each other during rotating by 360 degrees. On the upper part of the central mast (201-1) of the Y-shaped compound blades, a bevel mast (201-7) leaned forward by 45 degrees is separated from a vertical pillar. The bevel mast (201-7) leaned forward by 45 degrees is connected with the left and right forward-leaned grid frameworks (204). The paired individual triangular blades (213) may rotate left and right by 120 degrees between the left and right triangular grid frameworks by using the bevel mast (201-7) leaned forward by 45 degrees as axis. The forward-leaned grid frameworks are distributed in multiple layers in the vertical direction. Rhombic individual blades (212) which may rotate left and right by 360 degrees on the rotation shaft are fixedly mounted in the middle layer of rhombic grids, where the rotation shaft is parallel to the bevel mast (201-7) leaned forward by 45 degrees. Pentagonal individual blades (21402) which may rotate left and right 360 degrees on the rotation shaft are fixedly mounted in the uppermost layer of pentagonal grids. The lowermost layer of the forward-leaned grid framework (204) is connected to a cross rod (210) to form a multiple of transverse irregularly-polygonal grids, and polygonal one-piece blades (216) are mounted under the polygonal grids and may rotate by 45 degrees between the horizontal plane and the forward-leaned grid framework in the vertical direction by using the cross rod (210) as axis. The cross rod (210) is downward connected to the grid framework (204) vertical to the ground, to form a plurality of transverse pentagonal grids. Pentagonal individual blades (21402) which may rotate left and right 360 degrees on the rotation shaft are fixedly mounted in these grids.

With reference to FIGS. 4-1, 4-2 and 4-3, the individual polygonal blades (21401) rotating about the mast are mounted in the polygonal grids of the compound blade grid frameworks (204), is in rotatable connection to the mast (201) through three individual blade bearings (21102) by using the mast (201) as central axis, and is in same-direction transmission connection to an individual blade rotation shaft gear (21208) (referring to FIG. 3-2) through an annular transmission chain (21109) by an individual blade rotating-about mast gear (21108). The mast (201) on the compound blade surfaces are fixedly connected to the grid frameworks (204). Symmetrical right triangular frameworks distributed in the vertical direction are formed on two sides of the mast (201). A pair of triangular frames forms a rhombic grid, and an individual blade (211) rotating about the mast is mounted in one rhombic grid. The individual blade (211) rotating about the mast is provided with an individual blade border (21104) and an individual blade support lever (21103), and a blade surface (21101) is made of special cloth having a blade reinforcing rope (21105). An individual blade support pillar (21106) is vertical to the blade center and fixedly connected to the middle individual bearing (21102), and is in rotatable connection to the mast (201) through the individual blade bearing (21102). The individual blade support pillar (21106) is fixedly connected to the individual blade border (21104) and the individual blade support lever (21103) through a plurality of traction ropes (21107). The traction ropes (21107) are symmetrically distributed on left and right sides and the front face. The number (preferably 40) of traction ropes (21107) may be increased according to the structural strength of the individual blades. The individual blade rotating-about mast gear (21108) is fixedly connected to the border of the individual blade support lever (21103) with gear edges being aligned at lower waist midpoints of the rhombic blades, and the gear rotating about the mast is in rotatable connection to the mast (201) through the individual blade bearing (21102) on the mast by using the mast (201) as axis. The individual blade rotating-about mast gear (21108) has the same diameter and the same number of teeth as the individual blade rotation shaft gear (21208), and is in same-direction power transmission connection to the individual blade rotation shaft gear (21208) through the annular transmission chain (21109) (referring to FIG. 3-2). An individual blade bearing (21102) is provided within the mast (2010, and a variable-speed regulation motor device (21110) is transmitted to the individual blade bearing (21102) on the mast (201) through a gear. The individual blade bearing (21102) drives the individual blade rotating-about mast gear (21108) to rotate, and then drives a group of compound linkage individual blades to synchronously rotate in the same direction through the annular transmission chain (21109). The variable-speed regulation motor device (21110) is provided with a sensing element capable of performing automatic regulation through the remote automatic windmill control system (1). The pentagonal individual blades (21401) rotating about the mast, and the individual blades rotating about the mast which are not mounted on the individual blade rotating-about mast gear (21108) are driven to rotate by the individual blade bearing (21102) on the mast (201), while the individual blade bearing (21102) on the mast (201) are driven to rotate by the variable-speed regulation motor device (21110) through gear transmission. The variable-speed regulation motor device (21110) is provided with a sensing element capable of performing automatic regulation through the remote automatic windmill control system (1).

Figures 3, 4:
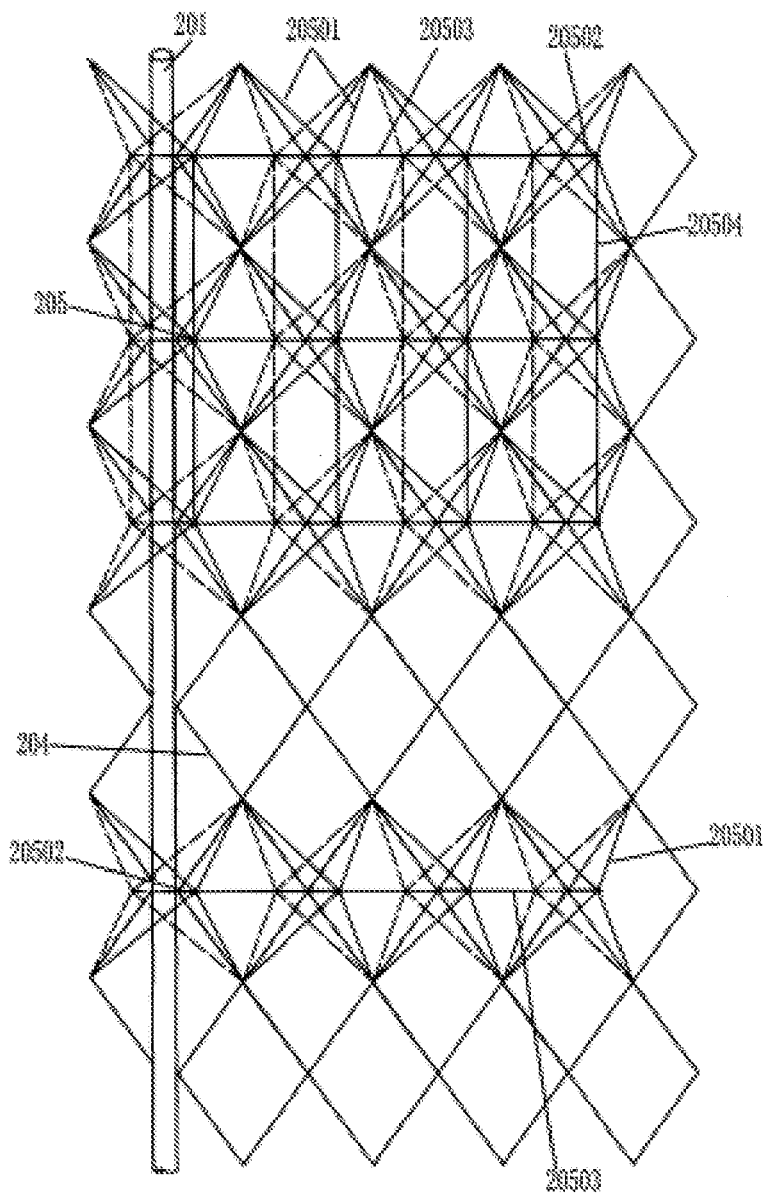
Figures 3, 4, 5:
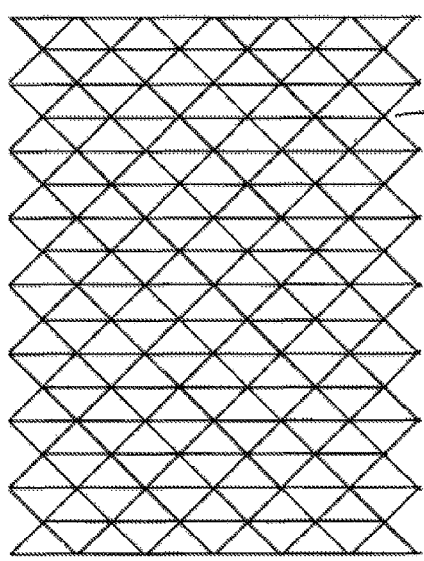
Figures 3, 4, 5, 6:
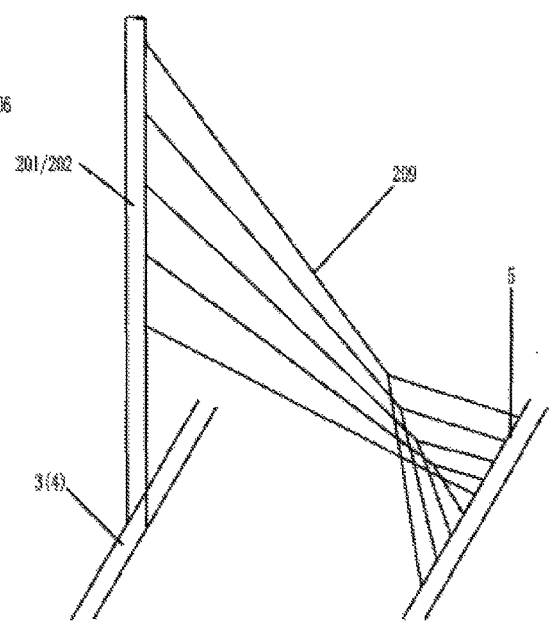

With reference to FIGS. 4-4, 4-5 and 4-6, the pentagonal individual blades (21402) which are fixed on the rotation shaft and may rotate left and right by 360 degrees are mounted in the pentagonal grids of the compound blade grid frameworks (204), and are in fixed series connection to the lower layer of rhombic individual blades 212 through individual blade couplings (217). The rhombic individual blades (21402) which are fixed on the rotation shaft and may rotate left and right by 360 degrees are mounted in the rhombic grids of the compound blade grid frameworks (204), and upper and lower ends of the rotation shaft of the individual blades are in rotatable connection to the grid frameworks (204) and may freely rotate by 360 degrees. The rotation shaft of the individual blades is fixedly connected to the individual blade border (21204), and the individual blade support lever (21203) is provided within the individual blade border (21204). The blade surfaces (21201) may be special cloth made from high-intensity and light-weight material, and are reinforced by a blade reinforcing rope (21205). The individual blade support pillar (21206) vertical passes through the blade center and is then fixedly connected to the blade rotation shaft (21202). The individual blade support pillar (21206) is fixedly connected to the individual border (21204), the individual blade support lever (21203) and the blade rotation shaft (21202) through a plurality of individual blade traction ropes (21207). The individual blade traction ropes (21207) are symmetrically distributed on front and rear faces of the blades. The number of the individual blade traction ropes (21207) may be increased according to the structural strength of the individual blades, preferably 32 individual blade traction ropes. The individual blade rotation shaft gear (21208) uses the blade rotation shaft (21202) as a center, and gear edges are suited at upper waist or lower waist midpoints of the rhombic blades. The single blade rotation shaft gear (21208) and the individual blade rotating-about mast gear (22208) in the same layer are in same-direction power transmission connection through the annular transmission chain (21109). Individual blades with rotation shaft gears are mounted on the rhombic grids of the grid frameworks (204), and individual blades without rotation shaft gears are fixedly connected in series in the vertical direction through individual blade couplings (217). The upper and lower individual blades are combined in segments through the individual blade couplings (217) and are rotated coaxially in the same direction. Every 2 to 5 layers of individual blades are combined in segments to form coaxial and same-direction compound blades which are combined in upper and lower layers.

With reference to FIGS. 4-7 and 4-8, the individual triangular blades (213) are in pairs mounted between the Y-shaped compound blade forward-leaned grid frameworks (204). Each of the individual triangular blades (213) is provided with an individual blade border (21304), a blade support lever (21303) and a blade surface (21301) made from special cloth. The individual triangular blades (213) are in rotatable connection to the mast (201) through an individual blade rotation shaft (21302). One corner of each of the individual triangular blades (213) is connected to a power traction rope (21305), and the power traction rope (21305) is connected to a rolling wheel (21306) through pulleys (21307) on the left and right triangular frameworks. The variable-speed regulation motor device (21110) pulls the power traction ripe (21306) by controlling the rotation of the rolling wheel (21306), and the power traction rope (21305) drives the triangular individual blade (213) to rotate by 120 degrees between the left and right triangular frameworks. The variable-speed regulation motor device (21110) is provided with a sensing element capable of performing automatic regulation through the remote automatic windmill control system (1), so that the paired individual triangular blades (213) are pulled out to cover the triangular frameworks for shielding wind when following wind and rotate to a minimum windscreen angle for sheltering from the wind when being against the wind.

As shown in FIG. 4-9, polygonal one-piece blades (216) are mounted between the forward-leaned grid frameworks (204) and the horizontal support frameworks (215) of the Y-shaped compound blades. Each of the polygonal one-piece blades (216) is provided with an individual blade border (21604) and a blade surface (21601) made from special cloth. The polygonal one-piece blades (216) are in rotatable connection to cross rods (210) through the rotation shaft (21602). Corners of the polygonal one-piece blades (216) are connected to power traction ropes (21603), and the power traction ropes (21603) are in annular circle connection to the pulleys (21606) on the forward-leaned grid frameworks (204) and transmission wheels (21607) in the cross rods (210) through the horizontal support frameworks (215). The variable-speed regulation motor device (21110) pulls the tractions in the cross rods and pulls the transmission wheels (21607) and the power traction ropes (21603) by controlling a rolling wheel (21605) to rotate forward or backward, so as to drive the polygonal one-piece blades (216) to rotate by 45 degrees between the horizontal support frameworks (215) and the forward-leaned grid frameworks. The variable-speed regulation motor device (21110) is provided with a sensing element capable of performing automatic regulation through the remote automatic windmill control system (1), so that the polygonal one-piece blades (216) cover the forward-leaned frameworks for shielding wind when following wind and suite on horizontal support frameworks (215) for sheltering from the wind at a minimum windscreen angle when being against the wind.

As shown in FIGS. 3-2 and 3-3, an annular transmission chain (21109) in the wind-tracing direction adjustment device is coupled to a plurality of individual blades to form a group of compound linkage individual blades. The variable-speed regulation motor device (21110) in the mast (201) drives the annular transmission chain (21109) in each group to rotate separately. Hydraulic pumps (306) (using pneumatic pumps (307) in extremely cold areas) and a servo motor (308) on the circular-rail windmill body (3) transfer power to the variable-speed regulation motor device (21110) in the mast (201) through an oil pipe (309) (using a gas pipe (310) in extremely code areas) in the mast (201). The compound linkage individual blades in each group on the three surfaces of the Y-shaped compound blades (2) are automatically controlled by the remote automatic windmill control system (1) so that the compound linkage individual blades in each group can perform synchronous rotation in a same direction, respectively.

As shown in FIG. 3-4, the rhombic grid formworks (204) of the Y-shaped compound blades (2) use support levers as borders and are connected to the mast (201), and the mast (201) is fixed on the circular-rail windmill body (3). Grid framework support frames (205) are fixedly connected to the nodes of the grid formworks (204), and symmetrically mounted on front and rear faces of the grid formworks (204). Each grid framework support frame (205) is consisted of a bevel support lever (20501), a support pillar (20502), a transverse connecting rod (20503) and a longitudinal connecting rod (20504). One layer of transversely connected grid framework support frames (205) is mounted every three lower layers of rhombic grids in the compound blade surfaces, while transversely and longitudinally connected grid framework support frames (205) are mounted in each upper layer of rhombic grids in the compound blade surfaces, so that the grid frames (204) are reinforced.

As shown in FIG. 5-1, three compound blade surfaces mounted with individual blades of each of the Y-shaped compound blades (2) are equal in length, and the length of each of the compound blade surfaces is equal to ¾ of the horizontal spacing of the Y-shaped compound blade (2). Between the Y-shaped compound blades (2) on the circular-rail windmill body (3), the middle compound blade surfaces (20301) on the middle circular-rail are discontinuously connected into one piece through the grid frameworks (204). The side compound blade surfaces (20302) on both sides are connected in the horizontal direction through a straight pulling cable (208) and the mast (201-1). The left compound blade surface (20302) is supported by the mast (201-5) pm the left circular-rail windmill body (3), and two side masts (202-1, 202-2) in front and rear of the mast (201-5) are connected and supported by the grid framework (204). The left compound blade surface (20302) is supported by the mast (201-6) on the right circular-rail windmill body (3), and two side masts (202-3, 202-4) in front and rear of the mast (201-6) are connected and supported by the grid framework (204). The side mast (202-1) and the side (202-2) on the same rail are discontinuously connected into one piece trough a rope net (206) (referring to FIGS. 3-5), and the side mast (202-3) and the side mast (202-4) on the same rail are discontinuously connected into one piece through a rope net (206). The middle compound blade surfaces 20303 are supported by four masts (201-1, 201-2, 201-3, 201-4) on the middle circular-rail windmill body (3) and are discontinuously connected into one piece through the grid framework (204). The masts (201-5, 201-4, 201-6) are transversely arranged in a straight line and transversely connected through a rope net (206), the side masts (202-2, 202-4) and the mast (201-3) are transversely arranged in a straight line and transversely connected through a rope net (206), and the side masts (202-1, 202-3) and the mast (201-1) are transversely arranged in a straight line and transversely connected through a rope net (206). The mast (201-5) and the side masts (202-1, 202-2) are transversely connected to the circular-rail one-piece cable pulling vehicles (5) on the same side through a stay cable (209) (referring to FIG. 3-6), respectively. The mast (201-6) and the side masts (202-3,

202-4) are transversely connected to the circular-rail one-piece cable pulling vehicles (5) on the same side through a stay cable (209) (referring to FIG. 3-6), respectively. A horizontal support pillar (207) having an included angle of 90 degrees with the compound blade surfaces is directly and fixedly connected to the mast (201-2) and the mast (201-3). The horizontal support pillar (207) is connected to a node of the grid framework (204) through a rope net (206), and is transversely connected to the circular-rail one-piece cable pulling vehicles (5) on two outer sides of the mast (201-2) through a stay cable (209). A horizontal support pillar vertical to the mast (201-1) is fixedly connected to the mast (201-2) and connected to the side compound blade surfaces (20302) through a straight pulling cable (208).

With reference to FIGS. 8-1, 8-2 and 8-3, the circular windmill rail (4) bearing the circular-rail windmill body (3) for running has: a lower rail (401) and an upper wheel groove (402) on two side faces thereof, a middle wheel groove (403) in the middle portion of an upper face thereof, and a gear (404) and a circular wheel (405) on a vertical shaft in the interior thereof. Windmill body side rails (301) are mounted on two sides of the circular-rail windmill body (3), a lower wheel (302) and an upper wheel (303) are mounted on the side rails, and a middle left wheel (304) and a middle right wheel (304) are mounted on the upper face of the windmill body for bearing hydraulic pumps (306) or pneumatic pumps (307), a servo motor (308) and the Y-shaped compound blades (2). A rack fixing groove is provided on the outer side of the windmill body side rails (301) to be meshed with the gear (404) on the vertical shaft. A flat rail is provided on the inner side of the windmill body side rails (301) to be engaged with the circular wheel (405) without any gap. The upper wheel groove (402) is rested on the upper wheel (303), the lower rail (401) is pressed under the lower wheel (302), and the middle wheel groove (403) is sandwiched between the middle left wheel (304) and the middle right wheel (305), so that the circular-rail windmill body (3) always runs along the circular windmill rail (4) and will not depart from the rail.

With reference to FIGS. 8-1, 3-2 and 3-3, the circular-rail windmill body (3) bears the compound blades. The mast (201) of the compound blades is a hollow cylinder with an oil pipe (309) and a variable-speed regulation motor device (21110) mounted therein. A pneumatic water tank (311) and a group of hydraulic pumps (306) connected in series are mounted under each mast (201), and the plurality of hydraulic pumps (306) are in cooperative connection to the respective upper wheel (303). The rotation of the upper wheel (303) pressurizes the hydraulic pumps (306) to form high-pressure transmission liquid which reciprocally runs along the oil pipe (309), so that the energy is transferred to the variable-speed regulation motor device (21110) in the mast (201) so as to provide power to the individual blades (211) rotating around the mast. The individual blades are transmission chained in a same direction transversely through the annular transmission chain (21109) to provide power for each layer of individual blades to rotate at a certain angular speed. A servo motor (308) and hydraulic pumps (306) driven by the servo motor (308) are mounted at the lower part of the mast (201). When the windmill reaches a startup wind speed and the direction of the individual blades is to be adjusted according to wind, the servo motor (308) is started by the remote automatic windmill control system (1) to drive the hydraulic pumps (306) to circularly transfer the transmission liquid so that the direction of all the individual blades is adjusted according to wind; and the servo motor (308) is turned off after the windmill rotates, and then the rotation of the upper wheel (303) drives the hydraulic pumps (306) to provide power for direction adjustment. In extremely code areas, the hydraulic pumps (306) on the circular windmill body (3) are replaced with pneumatic pumps (307). A gas tank (312) and a group of pneumatic pumps (307) connected in series are mounted under each mast (201). The plurality of pneumatic pumps (307) are in cooperative connection to the respective upper wheel (303), and the rotation of the upper wheel (303) pressurizes the pneumatic pumps (307) to form high-pressure gas which is transferred to the gas tank (312). The gas tank (312) is connected to a gas pipe (310) inside the mast (201) to transfer energy to the variable-speed regulation motor device (21110) in the mast (201) so as to provide power to the individual blades (211) rotating around the mast. When the windmill reaches the startup wind speed and the pressure of the gas tank (312) is insufficient, the servo motor is started to drive the pneumatic pumps (307) to pressurize the gas tank (312).

Figures 1, 2, 4:
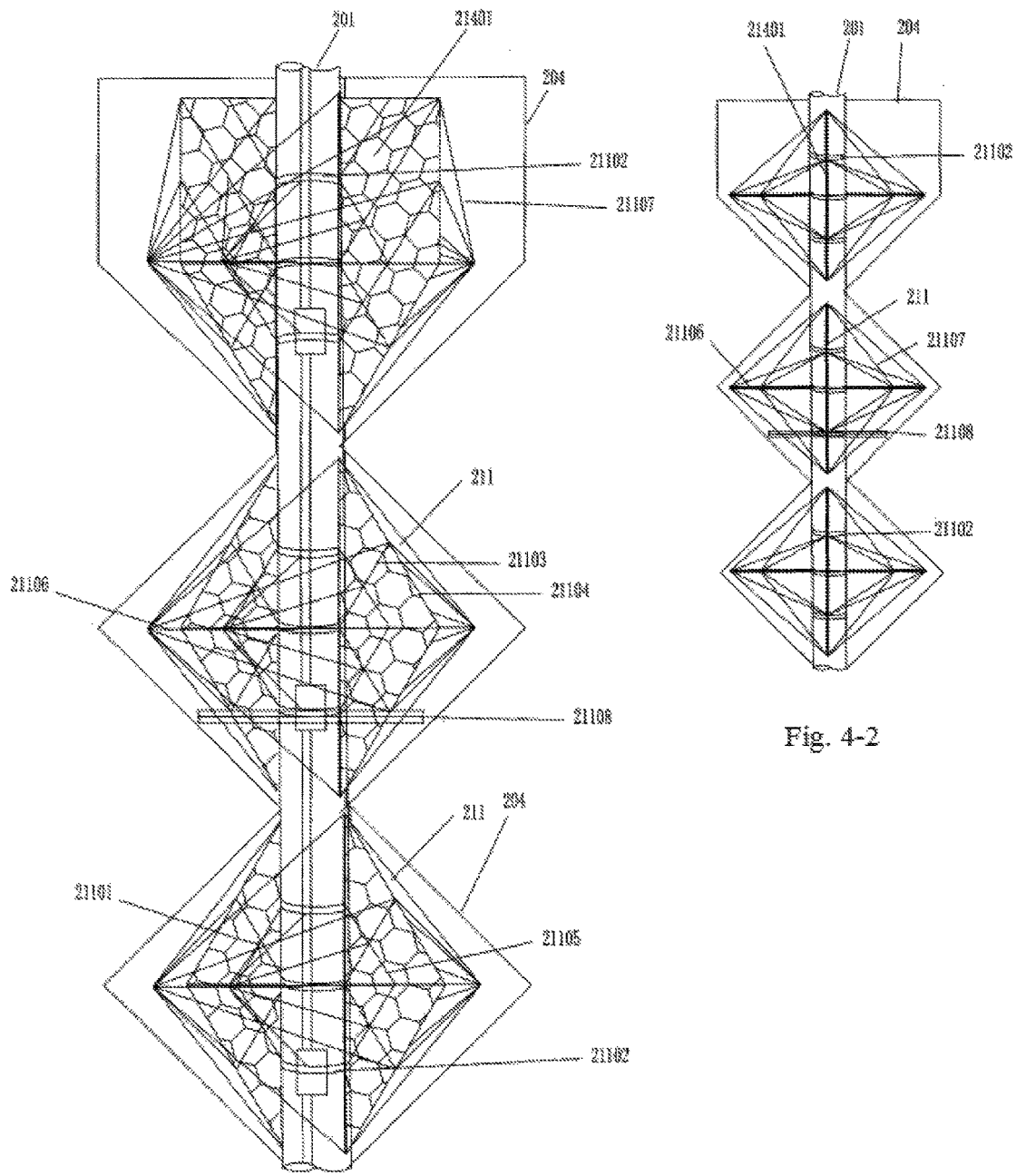
Figures 3, 4:
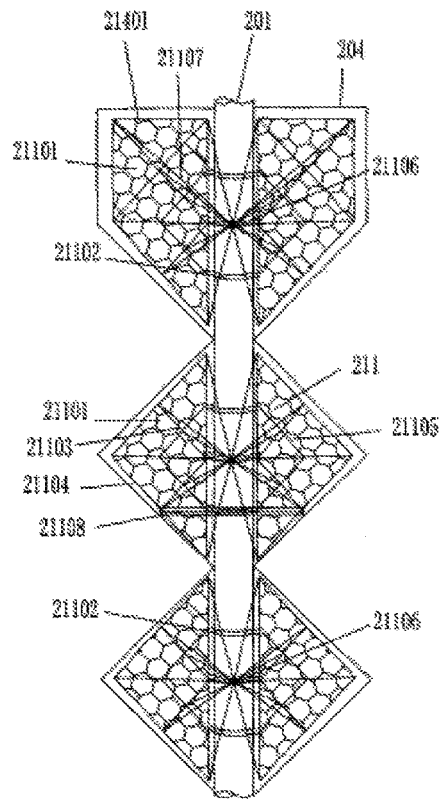
Figure 4:
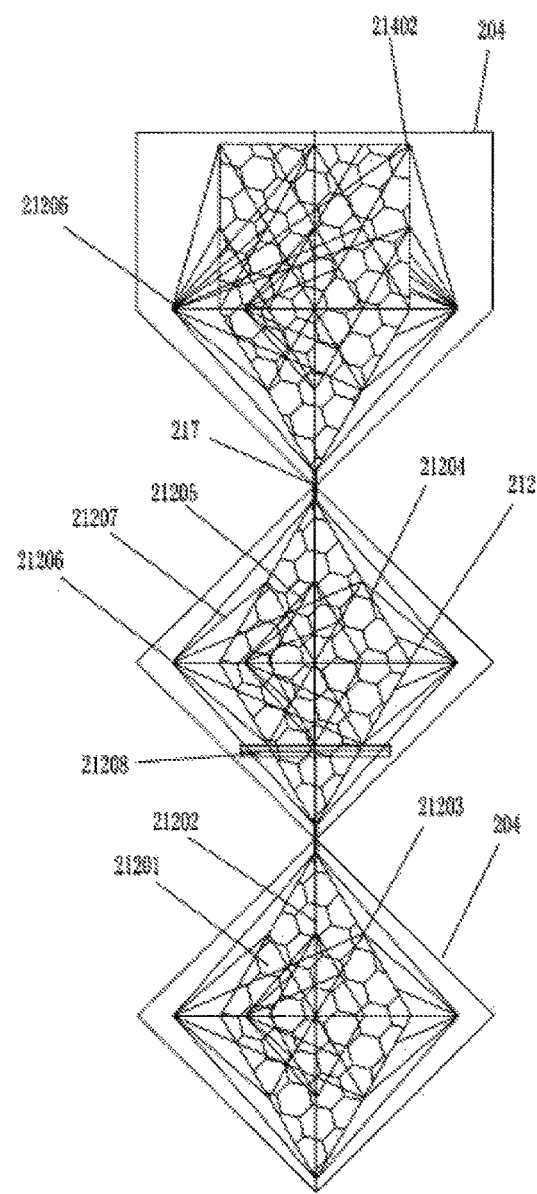
Figures 4, 5:
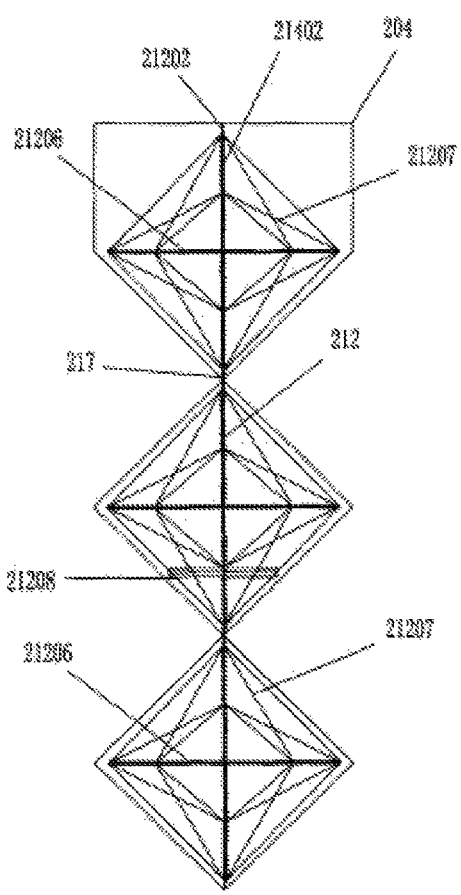
Figures 4, 5, 6:
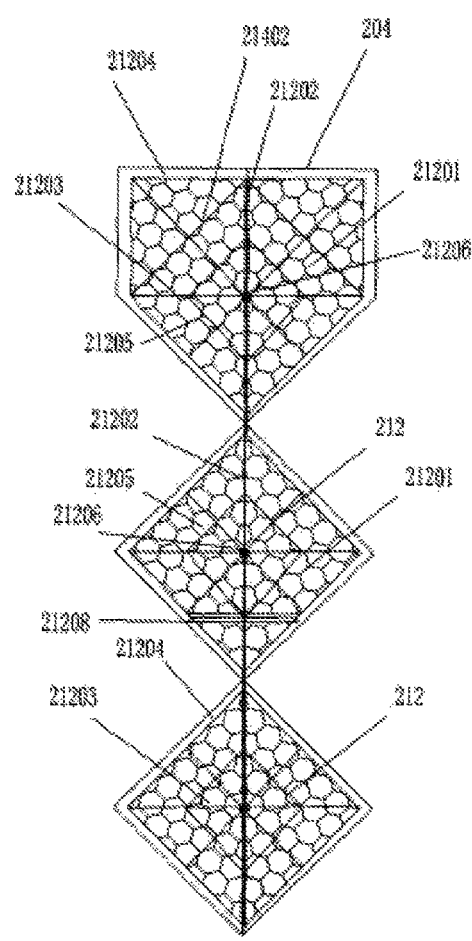
Figures 4, 5, 6, 7:
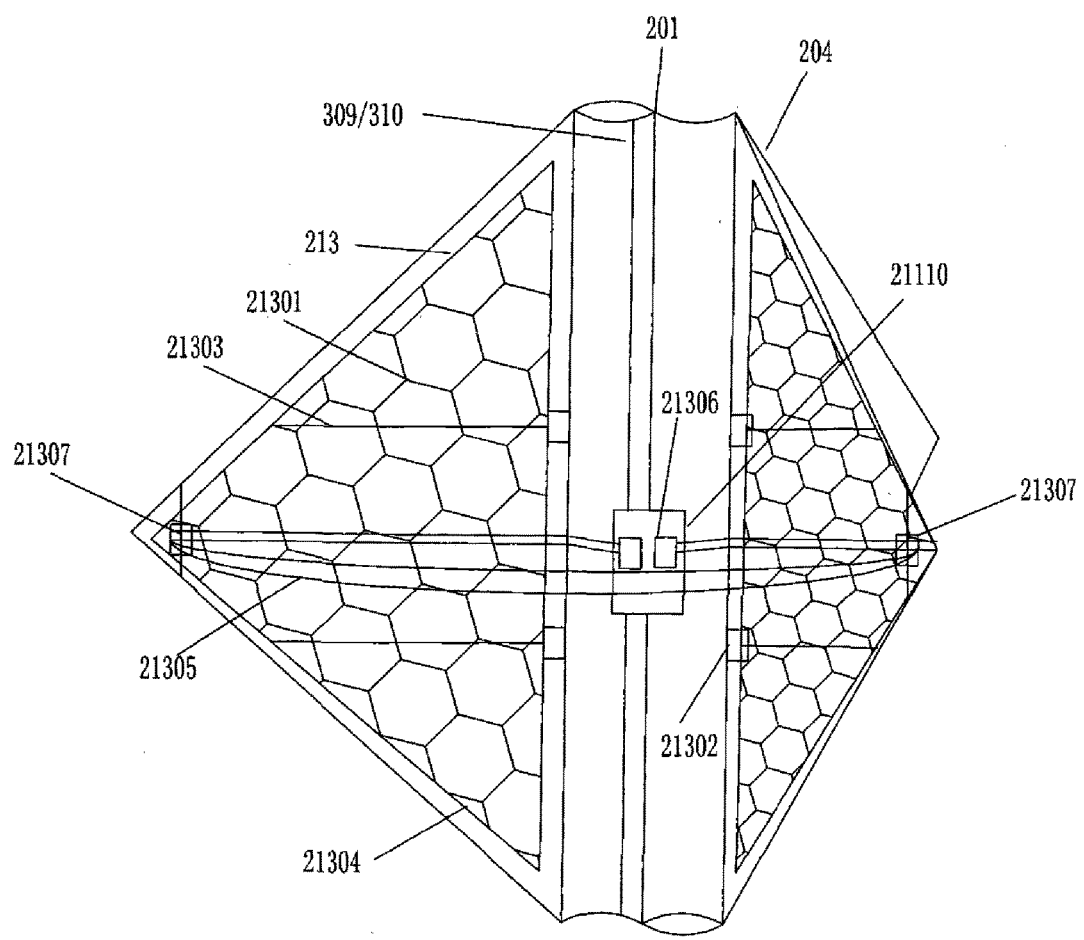
Figures 4, 5, 6, 7, 8:
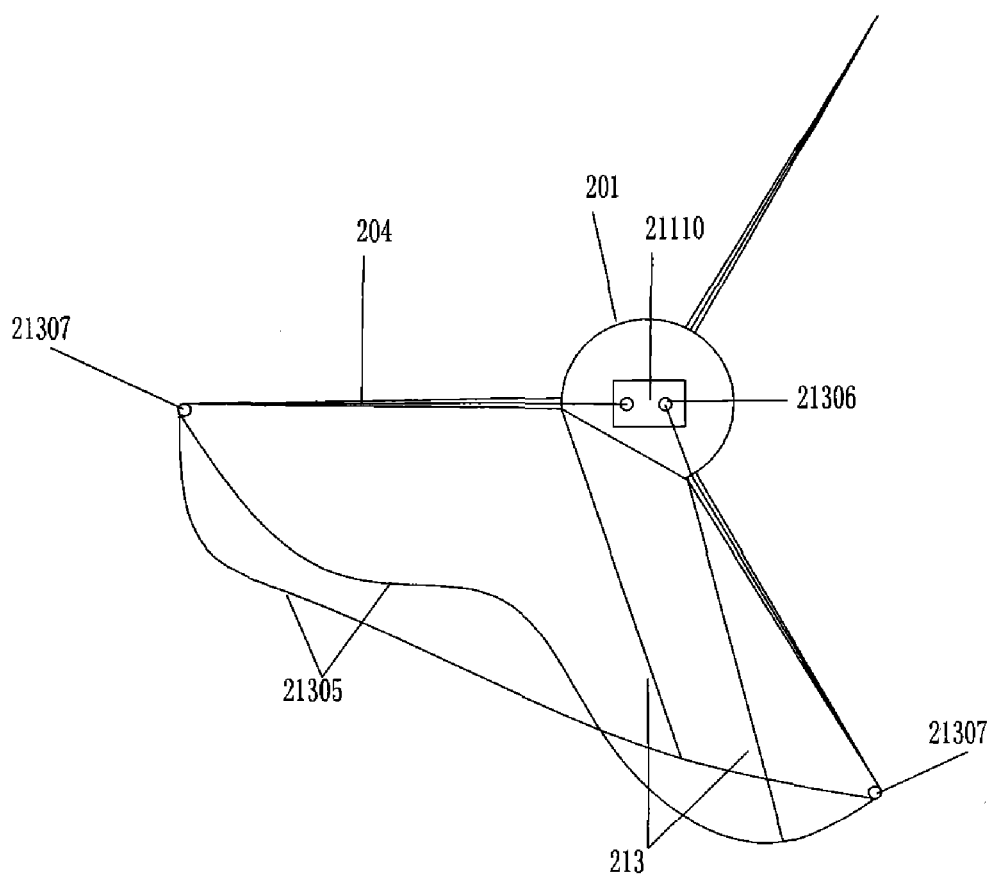

As shown in FIGS. 8-2 and 8-3, reversible hydraulic pumps (601) (or reversible pneumatic pumps (701)) are successively and equidistantly mounted on the ground on which the circular windmill rail (4) is provided. The windmill body side rails (301) are sandwiched between each group of the gear (401) and the circular wheel (405) on the vertical shaft mounted in the circular windmill rail (4). The gear (404) on each vertical shaft is connected to a reversible hydraulic pump (601) (or a reversible pneumatic pump (701)) on the ground through the vertical shaft (406), so that the power for operation of the circular-rail windmill body (3) may be transferred to the reversible hydraulic pump (601) (or reversible pneumatic pump (701)). A clutch device (407) is mounted on the vertical shaft (406), and the clutch connection or disconnection can be automatically controlled by the remote automatic windmill control system (1). As shown in FIGS. 8-2 and 8-3, the circular windmill rail (4) may be mounted in an overhead bridge manner, or may be in a ground roadbed manner, of course.

The hydraulic energy collection multi-unit power generating systems (6) are mounted between the three inner circles and the three outer circles of the circular-rail windmill and equidistantly and circumferentially distributed on one side of the circular-rail windmill rail. As shown in FIG. 6, each hydraulic energy collection multi-unit power generating system (6) includes a reversible hydraulic pump (601), a hydraulic pump water inlet pipe (602), a hydraulic pump water outlet pipe (603), a main water return pipe (609), a main water supply pipe (605), a water pipe valve (607), a high-pressure pneumatic water tank (613), an air compressor (612), a circulating water pool (609), a liquid feed pump (608) and a water wheel generator set (616). The hydraulic energy collection multi-unit power generating systems (6) use water as a medium in an energy conversion, transfer and circulation system, and are suitable for areas which are ice-free throughout the year. After the high-pressure water power in the high-pressure pneumatic water tank (613) is fed into the water wheel generator set (606) through the motor water inlet pipe (614) and then converted into electric power by power generation, water flows to the circulating water pool (609) along the motor water outlet pipe (618). The circulating water pool (609) is in T connection to a water feed pipe, a water valve and the liquid feed pump (608), and water may be fed into the circulating water pool (609). Gas in the high-pressure pneumatic water tank (613) can maintain a large volume space under a certain pressure and reduce the water hammer on the system due to the liquid pressure, the high-pressure pneumatic water tank (613) is in T connection to a pressure gas pipe (610), a gas valve (611) and an air compressor (612), and a volume space ratio of gas to water in the high-pressure pneumatic water tank (613) can be adjusted. The reversible hydraulic pumps (601) are mounted on the bottom of the circular windmill rail (4), and the reversible hydraulic pumps (601) are reversible hydraulic pumps which can convert mechanical energy into pressure energy of liquid and can also convert the pressure energy of liquid into mechanical energy. Each reversible hydraulic pump (601) is in airtight communication with the hydraulic pump water inlet pipe (602) with the water pipe valve (607) mounted thereon and the hydraulic pump water outlet pipe (603), a plurality of hydraulic pump water inlet pipes (602) are connected to the main water supply pipe (605) in parallel, and a plurality of hydraulic pump water outlet pipes (603) are connected to the main water return pipe (606) in parallel. Both the main water supply pipe (605) and the main water return pipe (606) extend along the circular windmill rail (4), and a number of reversible hydraulic pumps (601) are connected in parallel.

Next, the working principle of controlling synchronous operation of the windmill body by using the hydraulic energy collection multi-unit power generating systems (6) will be described as follows: three inner circles of the circular-rail windmill of each hydraulic energy collection multi-unit power generating system (6) use a set of main water supply pipe (605) and main water return pipe (606) to circulate water, while three outer circles of the circular-rail windmill uses another set of main water supply pipe (605) and main water return pipe (606) to circulate water; and, the remote automatic windmill control system (1) controls the on/off of the main water pipe valve to perform switchover between high-pressure water circulation and low-pressure water circulation, so as to switch the reversible hydraulic pumps (601) on the three inner circles of the circular-rail windmill or on the three outer circles of the circular-rail windmill for purpose of outputting power or providing power. When the main water pipe valves (604-1, 604-3, 604-5, 604-7) are closed, the main water pipe valves (604-2, 604-4, 604-6, 604-8) are opened, the main water supply pipe (605) is connected to the high-pressure pneumatic water tank (613) and the main water return pipe (606) is connected to the circulating water pool (609), the reversible hydraulic pumps (601) output power for power generation of the generators through water circulation. When the main water pipe valves (604-1, 604-3, 604-6 and 604-8) are closed while the main water pipe valves (604-2, 604-4, 604-5, 604-7) are opened, one set of main water supply pipe (605) is switched to be connected to the circulating water pool (609) and the main water return pipe (606) is connected to the high-pressure pneumatic water tank (613), so that one group of reversible hydraulic pumps (601) of the three circles of circular-rail windmill is allowed to obtain power for the operation of the windmill against the wind through water circulation. When the main water pipe valves (604-2, 604-4, 604-5, 604-7) are closed while the main water pipe valves (604-1, 604-3, 604-6, 604-8) are opened, one group of reversible hydraulic pumps (601) of other three circles of circular-rail windmill may be switched to obtain power for the operation of the windmill against the wind through water circulation. The relative orientation of the moving circular-rail windmill body (3) and the fixed circular-rail windmill rail (4) is measured by providing an orientation measurement sensor. Then, according to information from the orientation measurement sensor, the remote automatic windmill control system (1) controls the connection or disconnection of the gear (404) on the vertical shaft with or from the clutch device on the vertical shaft (406) between the reversible hydraulic pumps (601), and controls the on/off of the water pipe valves (607) of the reversible hydraulic pumps (601), the hydraulic pump water inlet pipe (602) and the hydraulic pump water outlet pipe (603), so as to adjust the number of the reversible hydraulic pumps (601) operating in parallel; and, by adjusting the number of the reversible hydraulic pumps (601) operating in parallel on each of three circles of the circular-rail, the resistance or impetus of each circle of the circular-rail windmill body (3) is adjusted so that three circles of the circular-rail windmill body (3) operate synchronously.

Next, the working principle of providing hydraulic pumps and a hydraulic pipe transmission device are provided to finely adjust the operation of the windmill body to ensure that three circles of the circular-rail windmill body (3) operate synchronously will be described as follows: the gear (404) on the vertical shaft of the circular windmill rail drives, through the connection with the vertical shaft (406), one reversible hydraulic pump to rotate; a closed-loop hydraulic pipe is connected with two reversible hydraulic pumps in series across two circles of the circular-rail and then connected with one hydraulic regulation pump in parallel; the hydraulic regulation pump can adjust the liquid flow in the hydraulic pipe bi-directionally so as to change a rotation speed ratio of the two reversible hydraulic pumps connected in series; there are multiple sets of such hydraulic pump fine adjustment devices equidistantly arranged between two circles of the circular-rail; and, according to information from the orientation measurement sensor, the remote automatic windmill control system (1) adjusts the rotation speed ratio of the two reversible hydraulic pumps connected in series in each set, so as to adjust the resistance or impetus of two circles of the circular-rail windmill body (3), so that three circles of the circular-rail windmill body (3) operate synchronously.

Next, the working principle of the water wheel generator set (616) will be described as follows: the water wheel generator set (616) is connected with multiple intelligent combinations in series and in parallel, the motor water pipe valve (619) is controlled to be turned on by the remote automatic windmill control system (1) to allow a high-pressure water flow to quickly rush to water wheel generators so that the water wheel generator set (616) accomplishes different power output processes in accordance with different combinations; the water wheel generator set (616) is connected between the motor water outlet pipe (618) and the motor water inlet pipe (614), and pressure relief and water return devices, i.e., a return pipe and an one-way automatic control valve (615), are connected with the generator set in parallel; when the generator set performs load rejection, the high-pressure water flow may be divided at the water wheel generators and then a part of the high-pressure water flow flows through the return pipe; and, the hydraulic energy collection multi-unit power generating systems (6) convert dynamic pressure energy in the energy circulating system device into electric energy, and the electric energy is then merged into the power grid by a power transmission cable (617).

The pneumatic energy collection multi-unit power generating systems (7) are mounted between the three inner circles and the three outer circles of the circular-rail windmill and equidistantly and circumferentially distributed on one side of the circular-rail windmill rail. Each pneumatic energy collection multi-unit power generating system (7) includes a reversible pneumatic pump (701), a pneumatic adjustment valve (702), a main gas supply pipe (703), a main gas return pipe (704), a pneumatic pump gas inlet pipe (705), a pneumatic pump gas outlet pipe (706), a gas pipe valve (707), a gas wheel generator set (709), a motor gas inlet pipe (710), a motor gas outlet pipe (711), a low-pressure gas tank (712), a high-pressure gas tank (713) and a motor gas pipe valve (714). The pneumatic energy collection multi-unit power generating systems (7) use air as a medium in the energy conversion, transfer and circulation system and are suitable for extremely cold areas. After the high-pressure gas in the high-pressure gas tank (713) is fed into the gas wheel generator set (709) through the motor gas inlet pipe (610) and then converted into electric energy by power generation, gas is circulated to the low-pressure gas tank (712) along the motor gas outlet pipe (711). The reversible pneumatic pumps (701) are mounted on the bottom of the circular windmill rail (4), and the reversible pneumatic pumps (701) are reversible pneumatic pumps which can convert mechanical energy into pressure energy of gas and can also convert the pressure energy of gas into mechanical energy. Each reversible pneumatic pump (701) is in airtight communication with the pneumatic pump gas inlet pipe (705) with the gas pipe valve (707) mounted thereon and the pneumatic pump gas outlet pipe (706), a plurality of pneumatic pump gas inlet pipes (705) are connected to the main gas supply pipe (703) in parallel, and a plurality of pneumatic pump gas outlet pipes (706) are connected to the main gas return pipe (704) in parallel. Both the main gas supply pipe (703) and the main gas return pipe (704) extend along the circular windmill rail (4), and a number of reversible pneumatic pumps (701) are connected in parallel.

Next, the working principle of controlling synchronous operation of the windmill body by using the pneumatic energy collection multi-unit power generating systems (6) will be described as follows: three inner circles of the circular-rail windmill of each pneumatic energy collection multi-unit power generating system (7) use a set of main gas supply pipe (703) and main gas return pipe (704) to circulate gas, while three outer circles of the circular-rail windmill uses another set of main gas supply pipe (703) and main gas return pipe (704) to circulate gas; and, the remote automatic windmill control system (1) controls the on/off of the main gas pipe valve to perform switchover between high-pressure gas circulation and low-pressure gas circulation, so as to switch the reversible pneumatic pumps (701) on the three inner circles of the circular-rail windmill or on the three outer circles of the circular-rail windmill for purpose of outputting power or providing power. When the main gas pipe valves (708-1, 708-3, 708-5, 708-7) are closed, the main gas pipe valves (708-2, 708-4, 708-6, 708-8) are opened, the main gas supply pipe (703) is connected to the high-pressure gas tank (713) and the main gas return pipe (704) is connected to the low-pressure gas tank (712), the reversible pneumatic pumps (701) output power for power generation of the generators through gas circulation. When the main gas pipe valves (708-1, 708-3, 708-6, 708-8) are closed while the main gas pipe valves (708-2, 708-4, 708-5, 708-7) are opened, one set of main gas supply pipe (703) is switched to be connected to the low-pressure gas tank (712) and the main gas return pipe (704) is connected to the high-pressure gas tank (713), so that one group of reversible pneumatic pumps (701) of the three circles of circular-rail windmill may be allowed to obtain power for operation of the windmill against the wind through gas circulation. When the main gas pipe valves (708-2, 708-4, 708-5, 708-7) are closed while the main gas pipe valves (708-1, 708-3, 708-6, 708-8) are opened, one group of reversible pneumatic pumps (701) of other three circles of circular-rail windmill may be switched to obtain power for operation of the windmill against the wind through gas circulation. The relative orientation of the moving circular-rail windmill body (3) and the fixed circular-rail windmill rail (4) is measured by providing an orientation measurement sensor; then, according to information from the orientation measurement sensor, the remote automatic windmill control system (1) controls the connection or disconnection of the gear (404) on the vertical shaft with or from the clutch device (407) on the vertical shaft (406) between the reversible pneumatic pumps (701), and controls the on/off of the gas pipe valves (707) of the reversible pneumatic pumps (701), the pneumatic pump gas inlet pipe (705) and the pneumatic pump gas outlet pipe (706), so as to adjust the number of the reversible pneumatic pumps (701) operating in parallel, so that the resistance or impetus of each circle of the circular-rail windmill body (3) is adjusted, and three circles of the circular-rail windmill body (3) operate synchronously.

Next, the working principle of the gas wheel generator set (709) in each of the pneumatic energy collection multi-unit power generating systems (7) will be described as follows: when the pressure reaches a specified value, the motor gas pipe valve (714) is controlled to be turned on by the remote automatic windmill control system (1) to allow high-pressure gas to quickly flow to the gas wheel generator set (709); the gas wheel generator set (709) is connected with multiple intelligent combinations in series and in parallel and can accomplish different power output processes of the generators; a pneumatic adjustment valve (702) capable of exchanging with the outside gas is provided on the low-pressure gas tank (712); when the gas pressure in the tank is lower the outside pressure, the pneumatic adjustment valve (702) is automatically turned on for air inflow; when the gas pressure in the tank reaches or is higher than the outside pressure, the pneumatic adjustment valve is automatically turned off, so that the gas is circulated in a closed manner and remains higher than a certain pressure of the outside; and, the pneumatic energy collection multi-unit power generating systems (7) convert dynamic pressure energy in the energy circulating system device into electric energy, and the electric energy is then merged into the power grid by a power transmission cable (617).

Figures 4, 5, 6, 7, 8, 9:
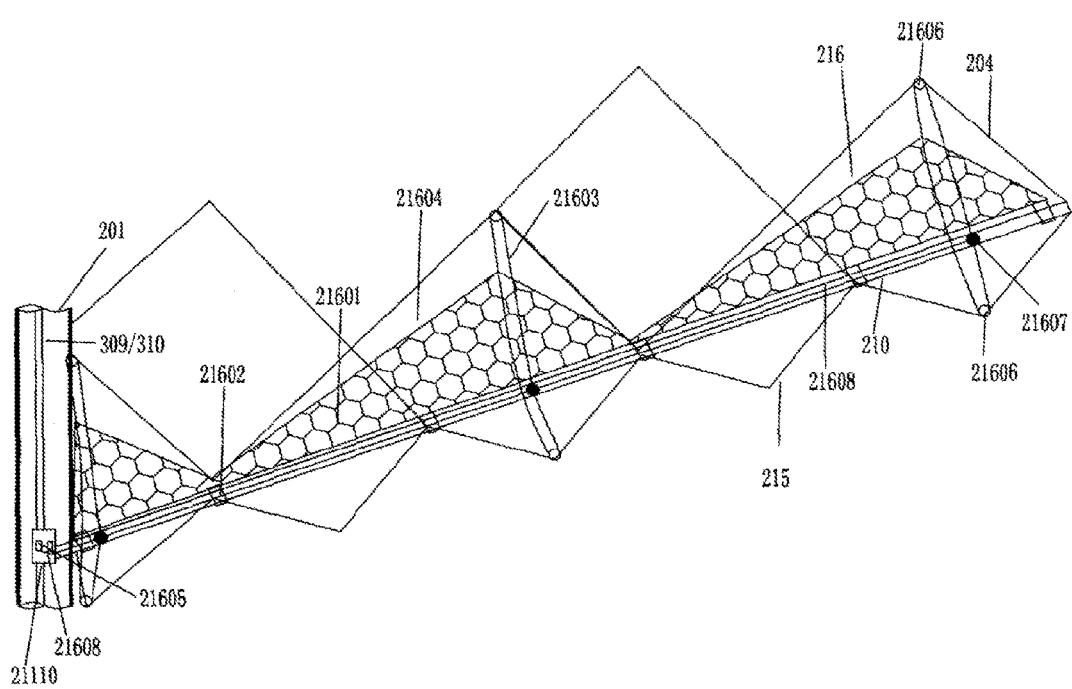
Figures 1, 5:
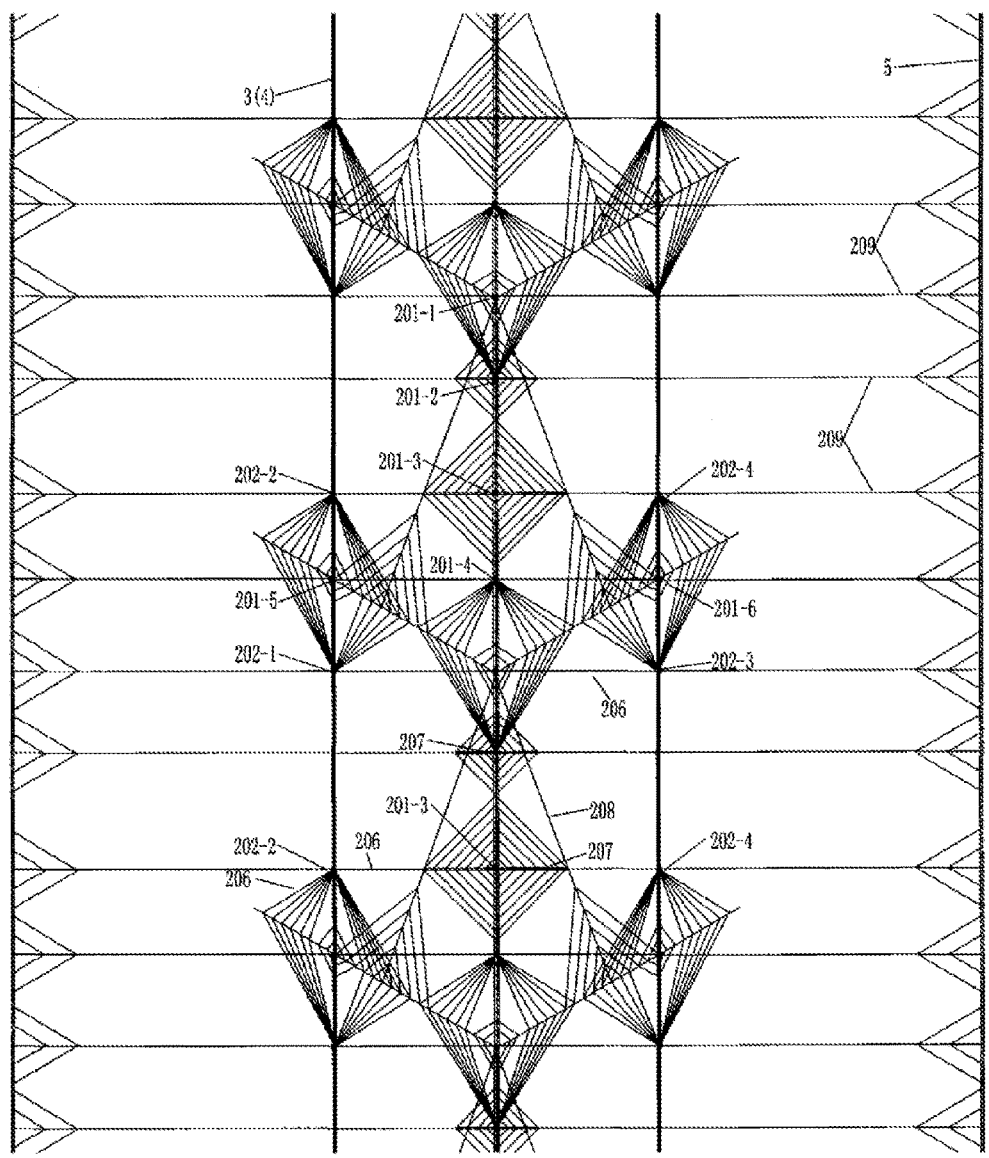
Figures 2, 5:
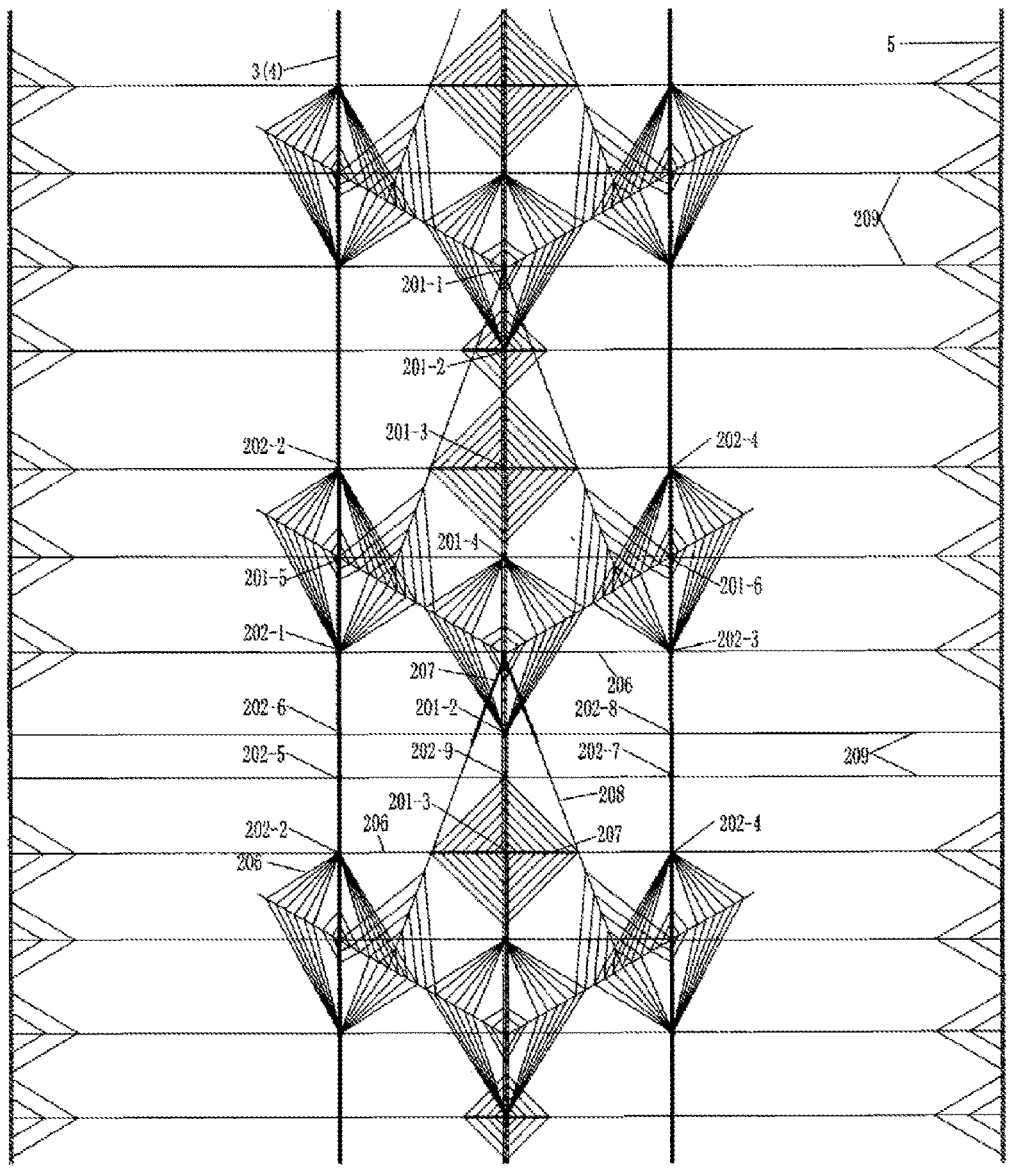
Figure 6:
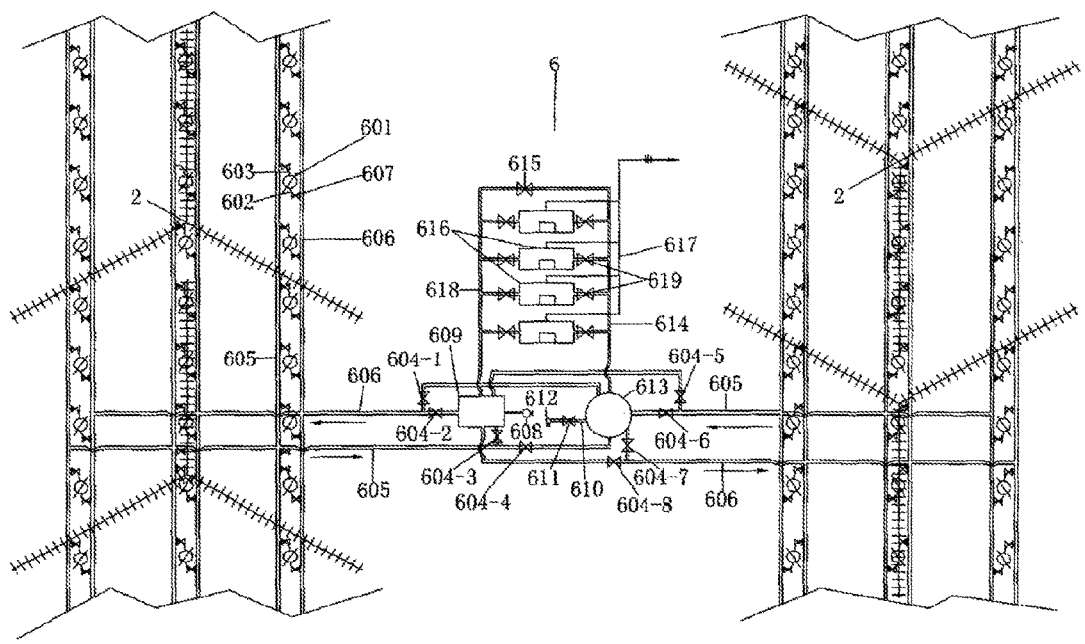
Figure 7:
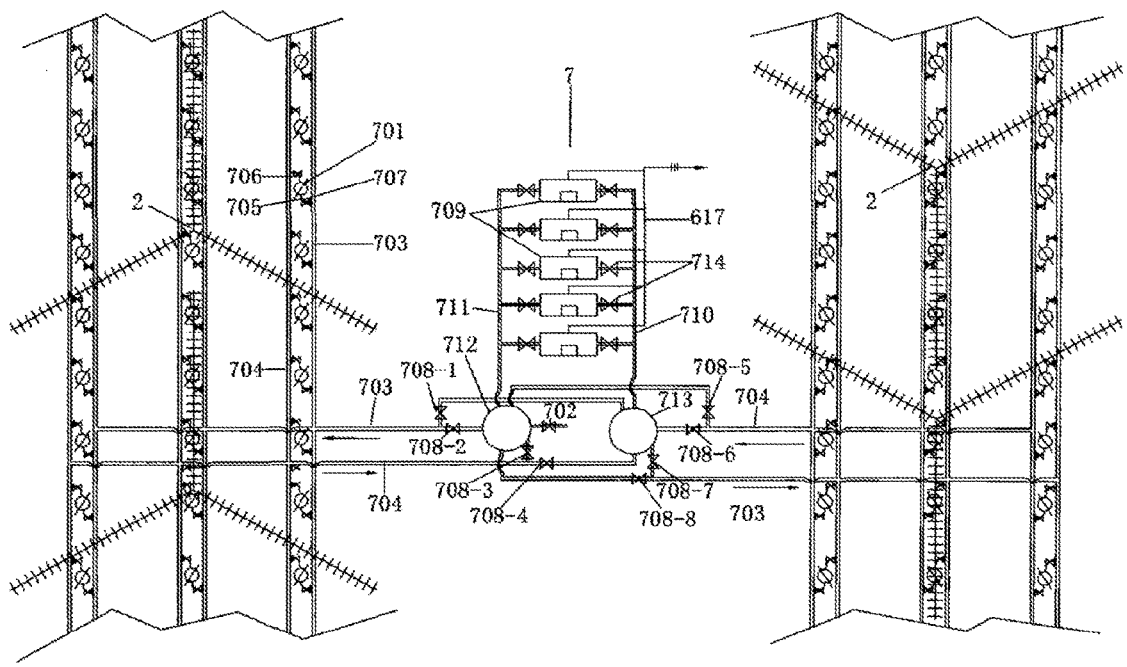
Figures 1, 8:
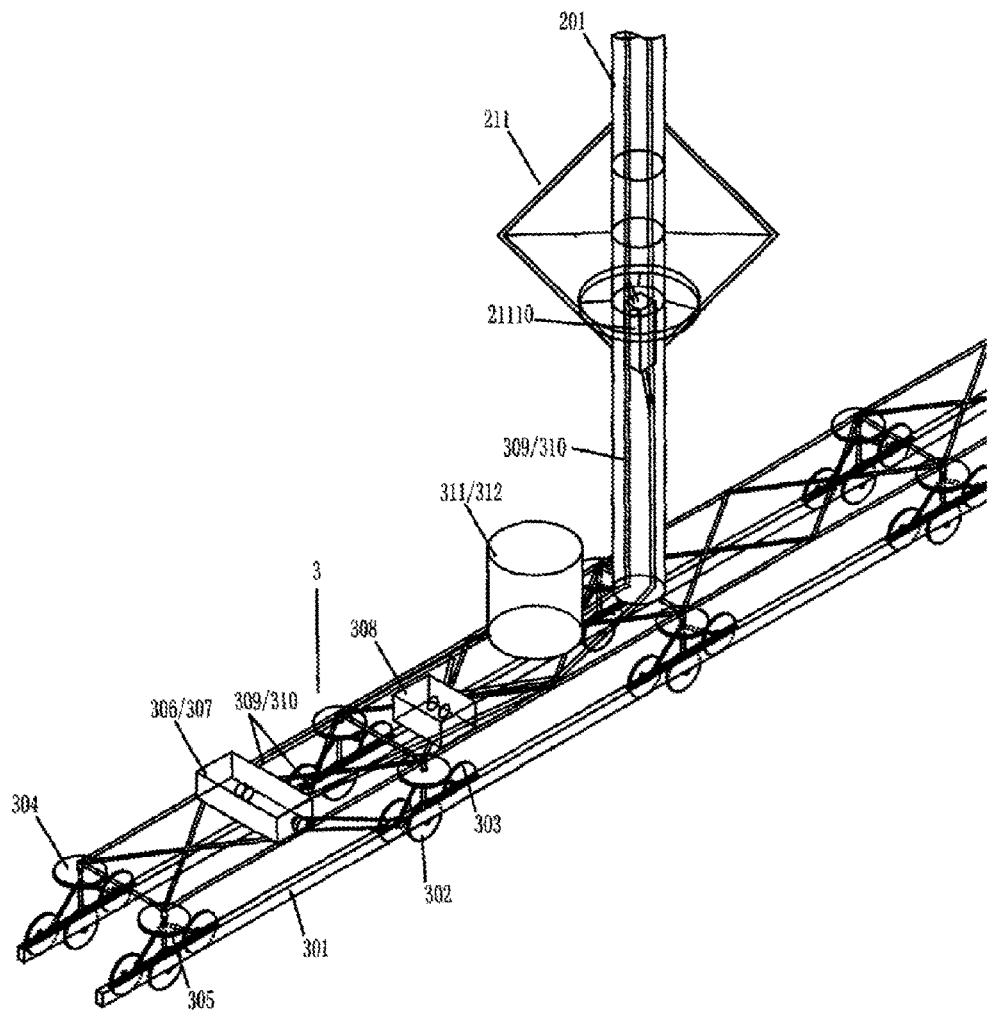
Figures 2, 8:
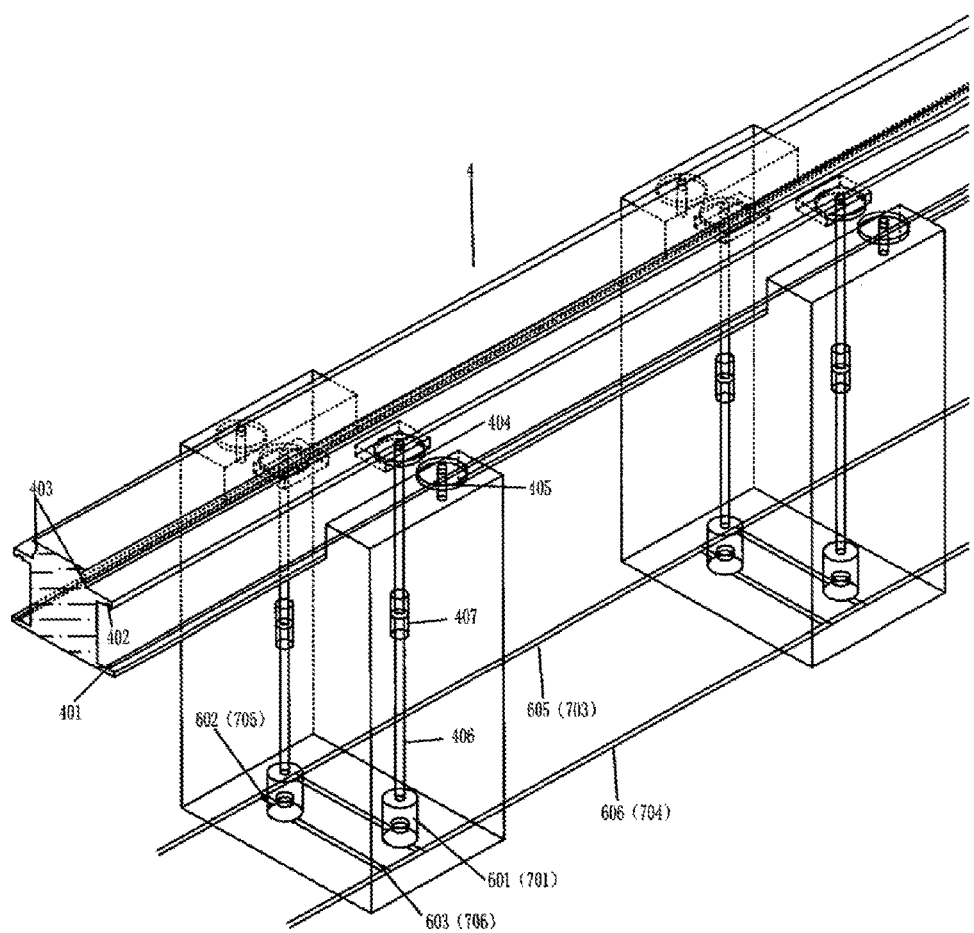
Figures 3, 8:
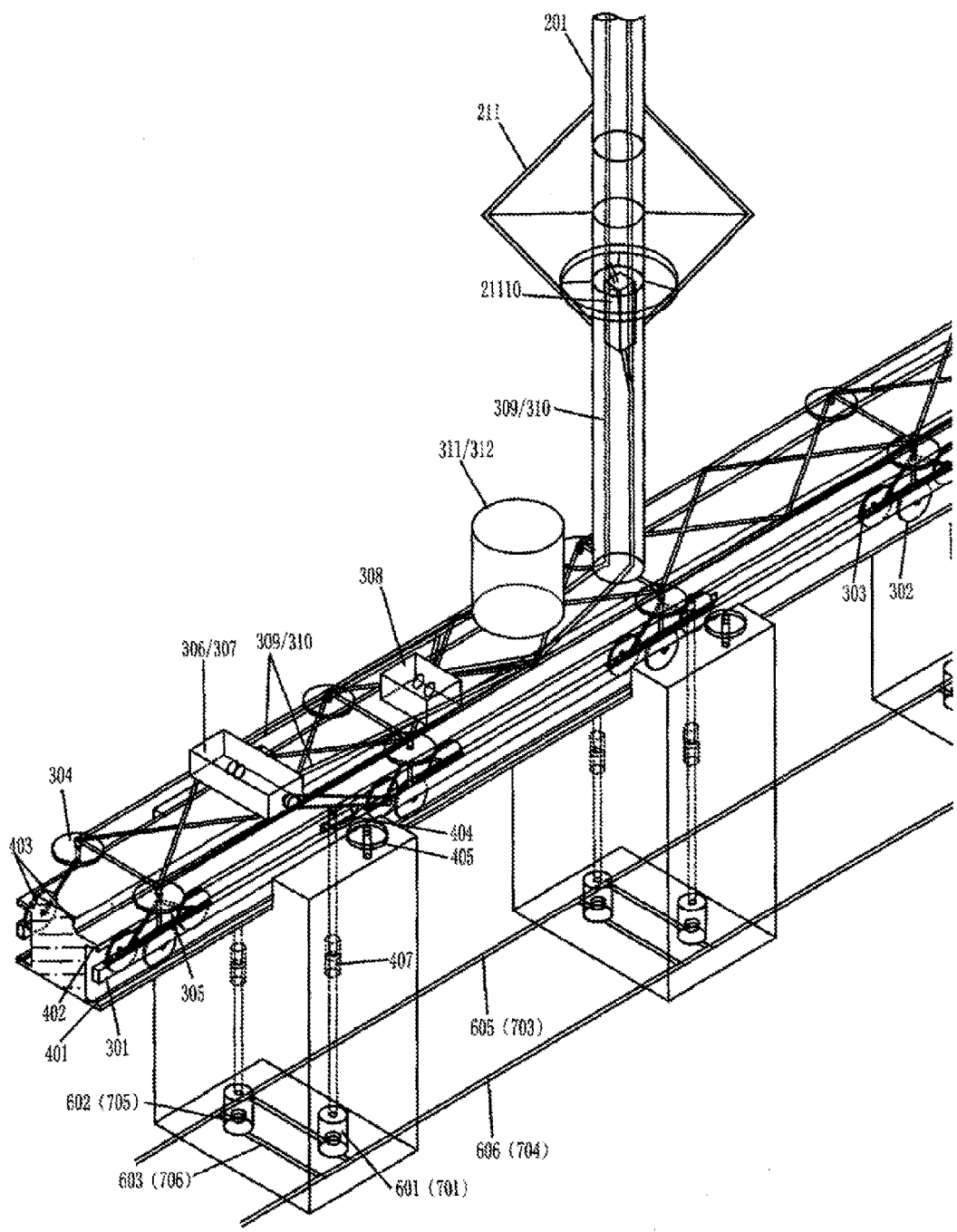
Figure 9:
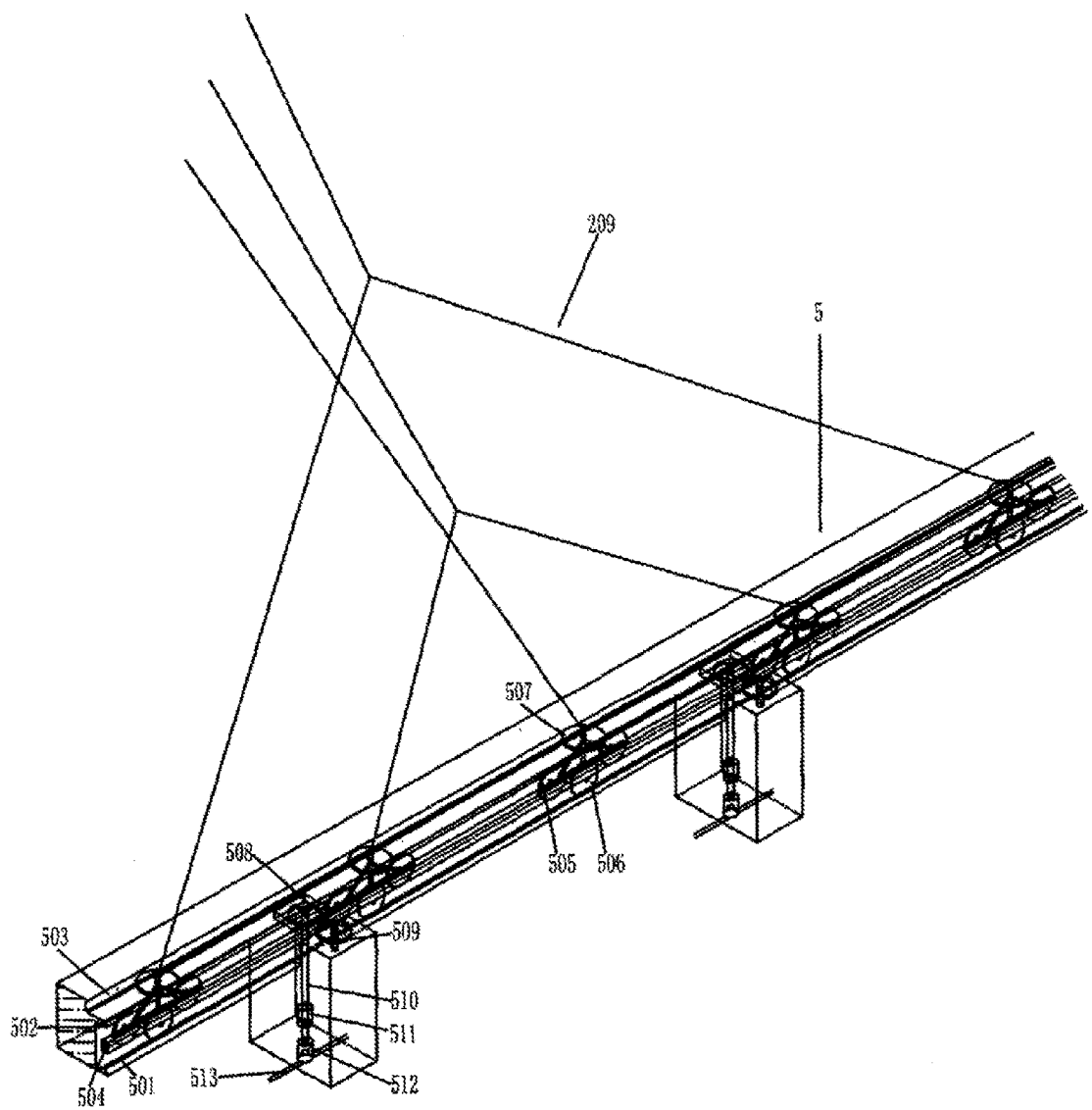

As shown in FIG. 9, the circular cable pulling vehicle rail has: an upper wheel groove (502) and a lower rail (501) on one side thereof, a middle wheel groove (503) in the middle portion of an upper face thereof, and a side driving gear (508) and a side auxiliary driving circular wheel (509) in the interior thereof. An upper support wheel (505), a lower support wheel (506) and a horizontal support wheel (507) are mounted on the cable pulling cable vehicle side rail (504). A rack fixing groove is provided on the outer side of the cable pulling cable vehicle side rail (504) to be meshed with the side driving gear (508). A flat rail is provided on the inner side of the cable pulling vehicle side rail to be engaged with the side auxiliary driving circular wheel (509), so that the cable pulling cable vehicle side rail (504) is engaged with the side driving gear (508) and the side auxiliary driving circular wheel (509) without any gap. The upper wheel groove (502) is rested on the top of the upper support wheel (505) of the circular-rail one-piece cable pulling vehicle, the lower rail (501) is pressed under the lower support wheel (506), the middle wheel groove (503) is flatly pressed under the horizontal support wheel (507), and a central shaft of the horizontal support wheel is vertically mounted on the cable pulling vehicle side rail (504). A stay cable (209) is mounted at the upper part of the central shaft of the horizontal support wheel, and the circular-rail one-piece cable pulling vehicles (5) are connected to the Y-shaped compound blades (2) in the middle through the stay cable (209), so that the circular-rail one-piece cable pulling vehicles (5) can bear the pulling force of the stay cable (209) and always run along the circular cable pulling vehicle rail and will not depart from the rail. The side driving gear (508) and the side auxiliary driving circular wheel (509) are equidistantly arranged on the circular cable pulling vehicle rail, and the side driving gear (508) drives the circular-rail one-piece cable pulling vehicles (5) to rotate.

Two combined transmission modes can be selected to allow the circular-rail one-piece cable pulling vehicles (5) and the circular-rail windmill to be operated at a same angular speed: mode 1: hydraulic transmission: a controllable variable-speed hydraulic motor (512) is additionally provided on the vertical shaft (510), the controllable variable-speed hydraulic motor (512) is connected to the high-pressure pneumatic water tank (613) and the circulating water pool (609) through water pipes, and the controllable variable-speed hydraulic motor (512) as a power source transfers power to the side driving gear (508) to cause the circular-rail one-piece cable pulling vehicles (5) to operate; mode 2: electric transmission: the servo motor (511) as a power source drives the side driving gear (508) to cause the circular-rail one-piece cable pulling vehicles (5) to operate, both the circular-rail one-piece cable pulling vehicles (5) and the circular-rail windmill body (3) are provided with orientation measurement sensors, and the remote automatic windmill control system (1) automatically adjusts the rotation speed transferred to the side driving gear (508) according to data from the orientation measurement sensors, so that the relative orientation deviation of the circular-rail one-piece cable pulling vehicles (5) and the circular-rail windmill body (3) is controlled within an allowable range.

Next, how to solve the influences of thermal expansion and cold contraction on the perimeter of the windmill will be described. The circular-rail one-piece cable pulling vehicles (5) are connected end to end, and controllable moving joints are provided at two or four equal-division points of the circumference so that the perimeter of the circular-rail one-piece cable pulling vehicles (5) remains unchanged after thermal expansion and cold contraction. As shown in FIG. 5-2, a connection method of controllable moving joints between two compound blades is as follows: a mast (201-2) and a side mast (201-9) on a middle circular-rail on the circular windmill body (3), a side mast (202-5) and a side mast (202-6) as well as s side mast (202-7) and a side mast (202-8) on two side circular-rails are connected through mast connecting rods, the remote automatic control system controls the servo motor to drive a spiral propeller, the spiral propeller facilitates the shortening or lengthening of the mast connecting rods, and the mast connecting rods are synchronously shortened or lengthened along with the moving joints of the circular-rail windmill body. The side compound blade surfaces (20302) between two side circular-rails are connected to the horizontal support pillar (207) vertical to the mast (201-1) through a straight pulling cable (208) between two compound blades. A hinge is passed through a center of a hollow horizontal support pillar (207) to be connected to a slide rod in the hollow horizontal support pillar (207). The slide rod reciprocally slides in the hollow horizontal support pillar (207) by connecting a transmission chain. The remote automatic control systems control the servo motor to provide power to the transmission chain for transmission, so as to adjust a slide distance of the slide rod. A clutch locking device is mounted on the slide rod so that the slide rod can be locked after moving to a desired place. The straight pulling cable (208) is connected to the slide rod so that the length of the straight pulling cable (208) is adjusted to be synchronously shortened or lengthened along with the moving joints of the circular-rail windmill body. A connection method of the controllable moving joints of the circular-rail windmill body (3) is as follows: the controllable moving joints are connected by using windmill body connecting rods which can be extended and contracted; the windmill body side rails (301) remain connected discontinuously, so that the gear (404) and the circular wheel (405) on the vertical shaft are continuously jointed for operation; the remote automatic control system controls the servo motor to drive a spiral propeller, and then the spiral propeller facilitates the shortening or lengthening of the windmill body connecting rods so as to adjust the length of the circular-rail windmill body (3). A connection method of the controllable moving joints of the circular-rail one-piece cable pulling vehicles (5) is as follows: the controllable moving joints are connected by using vehicle body connecting rods which can be extended and contracted, the remote automatic control system controls the servo motor to drive a spiral propeller, and the spiral propeller facilitates the shortening or lengthening of the cable pulling vehicle body connecting rods so that the length of the circular-rail one-piece cable pulling vehicles (5) is synchronously shortened or lengthened along with the moving joints of the circular-rail windmill body.

Next, how to solve the influences of the thermal expansion and cold contraction on the windmill across three circles of circular-rail will be described. The masts (201) of the Y-shaped compound blades (2) and the central shafts of the individual blades are made of material having a high thermal expansion and cold contraction coefficient, while the grid frameworks (204) and the support frame (205) for the grid frameworks are made of material having a low thermal expansion and cold contraction coefficient, so that the rise of temperature causes the grid framework (204) to be pulled up to counteract the transverse thermal expansion change, and the thermal expansion and cold contraction will cause a change in height of the compound blades but will not change the transverse span of the compound blades. The blade surfaces of the compound blades borne by the middle circle of the circular-rail among three circles of the circular-rail are made of material having a same thermal expansion and cold contraction coefficient as the circular-rail windmill body (3).

As shown in FIG. 1, the circular-rail windmill body (3) has six circles, and the opening angle of the Y-shaped compound blades (2) borne by three inner circles of the circular-rail windmill body (3) is opposite to the opening angle of the Y-shaped compound blades (2) borne by three outer circles of the circular-rail windmill body (3); and, there are four circles of the circular cable pulling vehicle rail, the circular-rail one-piece cable pulling vehicles (5) run on the circular cable pulling vehicle rail, and in every two circles, the circular-rail one-piece cable pulling vehicles (5) are connected with the Y-shaped compound blades (2) in the middle via the stay cable (209). However, the present invention is not limited thereto. The circular-rail windmill body (3) may have 6 circles, 12 circles or more, and the circular-rail one-piece cable pulling vehicles (5) may have four circles, 8 circles or more, where the diameter of the circles is from large to small, and smaller circles are sheathed within larger circles. Moreover, the circular-rail windmill body (3) and the circular-rail cable pulling vehicles (5) may be connected end to end, or may be divided into two or more segments, where the segments are not in contact with each other and run along the rail. The change of parameter of the windmill resulted from the thermal expansion and cold contraction may be adapted automatically.

The invention claimed is:

1. A bi-directional contra-rotating circular-rail bearing Y-shaped compound blade fluid energy collection multi-unit power generating windmill, comprising a remote automatic windmill control system (1), Y-shaped compound blades (2) formed by individual blades, a circular-rail windmill body (3) bearing the Y-shaped compound blade (2), a circular windmill rail (4) bearing the circular-rail windmill body (3) for running, circular-rail one-piece cable pulling vehicles (5) running on a circular cable pulling vehicle rail to pull a circular-rail windmill using a stay cable (209), hydraulic energy collection multi-unit power generating systems (6) or pneumatic energy collection multi-unit power generating systems (7), wherein:
- the Y-shaped compound blades (2) are borne by three circles of the circular-rail windmill body (3) and are arranged successively and equidistantly on the circular-rail windmill body (3);
- the circular-rail windmill body (3) has six circles, and an opening angle of the Y-shaped compound blades (2) borne by three inner circles of the circular-rail windmill body (3) is opposite to the opening angle of the Y-shaped compound blades (2) borne by three outer circles of the circular-rail windmill body (3) so that the bi-direction contra-rotation of the circular-rail windmill is realized; and
- there are four circles of the circular cable pulling vehicle rail, the circular-rail one-piece cable pulling vehicles (5) run on the circular cable pulling vehicle rail, and in every two circles, the circular-rail one-piece cable pulling vehicles (5) are connected with the Y-shaped compound blades (2) in a middle via the stay cable (209).

2. The bi-directional contra-rotating circular-rail bearing Y-shaped compound blade fluid energy collection multi-unit power generating windmill according to claim 1, characterized in that the Y-shaped compound blade (2) comprises a middle compound blade surface (20301) and left and right side compound blade surfaces (20302), the three surfaces having an included angle of 120 degrees, being equal in length and being in a Y shape when viewed from the top; side forward-leaned compound blade surfaces (20303) which are leaned forward by 45 degrees are mounted on the tops of the side compound blade surfaces (20302); and, the compound blade surfaces are changed to be leaned forward by 45 degrees from being vertical to the ground, wherein, each of the compound blade surfaces of the Y-shaped compound blade (2) is formed by a grid framework (204), individual blades and a mast; the grid framework (204) is formed by a plurality of grids distributed in both the horizontal direction and the vertical direction, and fixed rhombic individual blades (212), individual blades (211) rotating about the mast, pentagonal individual blades, individual triangular blades (213) and polygonal one-piece blades (216) are mounted in the grids of the grid framework (204);
- a wind-tracing direction adjustment device is mounted between the individual blades; an annular transmission chain in the wind-tracing direction adjustment device is coupled to a plurality of individual blades to form a group of compound linkage individual blades; and, the compound linkage individual blades in each group are automatically controlled by the remote automatic windmill control system (1) so that the compound linkage individual blades in each group can perform synchronous rotation in a same direction, respectively.

3. The bi-directional contra-rotating circular-rail bearing Y-shaped compound blade fluid energy collection multi-unit power generating windmill according to claim 1, characterized in that the circular windmill rail (4) bearing the circular-rail windmill body (3) for running has: a lower rail (401) and an upper wheel groove (402) on two side faces thereof, a middle wheel groove (403) in the middle portion of an upper face thereof, and a gear (404) and a circular wheel (405) on a vertical shaft in the interior thereof; windmill body side rails (301) are mounted on two sides of the circular-rail windmill body (3), a lower wheel (302) and an upper wheel (303) are mounted on the side rails, and a middle left wheel (304) and a middle right wheel (304) are mounted on the upper face of the windmill body for bearing hydraulic pumps (306) or pneumatic pumps (307), a servo motor (308) and the Y-shaped compound blades (2); a rack fixing groove is provided on the outer side of the windmill body side rails (301) to be meshed with the gear (404) on the vertical shaft; a flat rail is provided on the inner side of the windmill body side rails (301) to be engaged with the circular wheel (405), the upper wheel groove (402) is rested on the upper wheel (303), the lower rail (401) is pressed under the lower wheel (302), the middle wheel groove (403) is sandwiched between the middle left wheel (304) and the middle right wheel (305), so that the circular-rail windmill body (3) always runs along the circular windmill rail (4);
- controllable moving joints are provided at two or four equal-division points of the circular-rail windmill body (3) so that the perimeter of the circular-rail windmill body (3) remains unchanged after thermal expansion and cold contraction.

4. The bi-directional contra-rotating circular-rail bearing Y-shaped compound blade fluid energy collection multi-unit power generating windmill according to claim 1, characterized in that the hydraulic energy collection multi-unit power generating systems (6) are mounted between the three inner circles and the three outer circles of the circular-rail windmill and equidistantly and circumferentially distributed on one side of the circular-rail windmill rail; each hydraulic energy collection multi-unit power generating system (6) comprises a reversible hydraulic pump (601), a hydraulic pump water inlet pipe (602), a hydraulic pump water outlet pipe (603), a main water return pipe (609), a main water supply pipe (605), a water pipe valve (607), a high-pressure gas tank (613), an air compressor (612), a circulating water pool (609), a liquid feed pump (608) and a water wheel generator set (616), and is controlled by the remote automatic windmill control system (1), wherein:
- the hydraulic energy collection multi-unit power generating systems (6) use water as a medium in an energy conversion, transfer and circulation system, and are suitable for areas which are ice-free throughout the year;
- after the high-pressure water power in the high-pressure gas tank (613) is fed into the water wheel generator set (606) through the motor water inlet pipe (614) and then converted into electric power by power generation, water flows to the circulating water pool (609) along the motor water outlet pipe (618);
- the circulating water pool (609) is in T connection to a water feed pipe, a water valve and the liquid feed pump (608), and water may be fed into the circulating water pool (609);
- gas in the high-pressure gas tank (613) can maintain a large volume space under a certain pressure and reduce the water hammer on the system due to the liquid pressure, the high-pressure gas tank (613) is in T connection to a pressure gas pipe (610), a gas valve (611) and an air compressor (612), and a volume space ratio of gas to water in the high-pressure gas tank (613) can be adjusted;

the reversible hydraulic pumps (601) are reversible hydraulic pumps which can convert mechanical energy into pressure energy of liquid and can also convert the pressure energy of liquid into mechanical energy; each reversible hydraulic pump (601) is in airtight communication with the hydraulic pump water inlet pipe (602) with the water pipe valve (607) mounted thereon and the hydraulic pump water outlet pipe (603), a plurality of hydraulic pump water inlet pipes (602) are connected to the main water supply pipe (605) in parallel, and a plurality of hydraulic pump water outlet pipes (603) are connected to the main water return pipe (606) in parallel; and, and a number of reversible hydraulic pumps (601) run in parallel through both the main water supply pipe (605) and the main water return pipe (606).

5. The bi-directional contra-rotating circular-rail bearing Y-shaped compound blade fluid energy collection multi-unit power generating windmill according to claim 4, characterized in that, for the hydraulic energy collection multi-unit power generating systems (6), three inner circles of the circular-rail windmill of each hydraulic energy collection multi-unit power generating system (6) use a set of main water supply pipe (605) and main water return pipe (606) to circulate water, while three outer circles of the circular-rail windmill uses another set of main water supply pipe (605) and main water return pipe (606) to circulate water; and, the remote automatic windmill control system (1) controls the on/off of the main water pipe valve to perform switchover between high-pressure water circulation and low-pressure water circulation, so as to switch the reversible hydraulic pumps (601) on the three inner circles of the circular-rail windmill or on the three outer circles of the circular-rail windmill for purpose of outputting power or providing power.

6. The bi-directional contra-rotating circular-rail bearing Y-shaped compound blade fluid energy collection multi-unit power generating windmill according to claim 3, characterized in that, the gear (404) on each vertical shaft of the circular windmill rail (4) is connected to a reversible hydraulic pump (601) (or a reversible pneumatic pump (701)) on the ground through the vertical shaft (406), the relative orientation of the moving circular-rail windmill body (3) and the fixed circular-rail windmill rail (4) is measured by providing an orientation measurement sensor for the remote automatic windmill control system (1); then, according to information from the orientation measurement sensor, the remote automatic windmill control system (1) controls the connection or disconnection of the gear (404) on the vertical shaft with or from the clutch device on the vertical shaft (406) between the reversible hydraulic pumps (601), and controls the on/off of the water pipe valves (607) of the reversible hydraulic pumps (601), the hydraulic pump water inlet pipe (602) and the hydraulic pump water outlet pipe (603), so as to adjust the number of the reversible hydraulic pumps (601) operating in parallel; and, by adjusting the number of the reversible hydraulic pumps (601) operating in parallel on each of three circles of the circular-rail, the resistance or impetus of each circle of the circular-rail windmill body (3) is adjusted so that three circles of the circular-rail windmill body (3) operate synchronously.

7. The bi-directional contra-rotating circular-rail bearing Y-shaped compound blade fluid energy collection multi-unit power generating windmill according to claim 4, characterized in that, for the hydraulic energy collection multi-unit power generating systems (6), hydraulic pumps and a hydraulic pipe transmission device are provided to finely adjust the operation of the windmill body to ensure that three circles of the circular-rail windmill body (3) operate synchronously; the gear (4) on the vertical shaft of the circular windmill rail drives, through the connection with the vertical shaft (406), one reversible hydraulic pump to rotate; a closed-loop hydraulic pipe is connected with two reversible hydraulic pumps in series across two circles of the circular-rail and then connected with one hydraulic regulation pump in parallel; the hydraulic regulation pump can adjust the liquid flow in the hydraulic pipe bi-directionally so as to change a rotation speed ratio of the two reversible hydraulic pumps connected in series; there are multiple sets of such hydraulic pump fine adjustment devices equidistantly arranged between two circles of the circular-rail; and, according to information from the orientation measurement sensor, the remote automatic windmill control system (1) adjusts the rotation speed ratio of the two reversible hydraulic pumps connected in series in each set, so as to adjust the resistance or impetus of two circles of the circular-rail windmill body (3).

8. The bi-directional contra-rotating circular-rail bearing Y-shaped compound blade fluid energy collection multi-unit power generating windmill according to claim 4, characterized in that, for the hydraulic energy collection multi-unit power generating systems (6), the water wheel generator set (616) is connected with multiple intelligent combinations in series and in parallel, the motor water pipe valve (619) is controlled to be turned on by the remote automatic windmill control system (1) to allow a high-pressure water flow to quickly rush to water wheel generators so that the water wheel generator set (616) accomplishes different power output processes in accordance with different combinations; the water wheel generator set (616) is connected between the motor water outlet pipe (618) and the motor water inlet pipe (614), and pressure relief and water return devices, i.e., a return pipe and an one-way automatic control valve (615), are connected with the generator set in parallel; when the generator set performs load rejection, the high-pressure water flow may be divided at the water wheel generators and then a part of the high-pressure water flow flows through the return pipe; and, the hydraulic energy collection multi-unit power generating systems (6) convert dynamic pressure energy in the energy circulating system device into electric energy, and the electric energy is then merged into the power grid by a power transmission cable (617).

9. The bi-directional contra-rotating circular-rail bearing Y-shaped compound blade fluid energy collection multi-unit power generating windmill according to claim 1, characterized in that the pneumatic energy collection multi-unit power generating systems (7) are mounted between the three inner circles and the three outer circles of the circular-rail windmill and equidistantly and circumferentially distributed on one side of the circular-rail windmill rail; each pneumatic energy collection multi-unit power generating system (7) comprises a reversible pneumatic pump (701), a pneumatic adjustment valve (702), a main gas supply pipe (703), a main gas return pipe (704), a pneumatic pump gas inlet pipe (705), a gas pump gas outlet pipe (706), a gas pipe valve (707), a gas wheel generator set (709), a motor gas inlet pipe (710), a motor gas outlet pipe (711), a low-pressure gas tank (712), a high-pressure gas tank (713) and a motor gas pipe valve (714), and is controlled by the remote automatic windmill control system (1), wherein:

the pneumatic energy collection multi-unit power generating systems (7) use air as a medium in the energy conversion, transfer and circulation system and are suitable for extremely cold areas;

after the high-pressure gas in the high-pressure gas tank (713) is fed into the gas wheel generator set (709) through the motor gas inlet pipe (610) and then converted into electric energy by power generation, gas is circulated to the low-pressure gas tank (712) along the motor gas outlet pipe (711);

the reversible pneumatic pumps (701) are reversible pneumatic pumps which can convert mechanical energy into pressure energy of gas and can also convert the pressure energy of gas into mechanical energy; each reversible pneumatic pump (701) is in airtight communication with the pneumatic pump gas inlet pipe (705) with the gas pipe valve (707) mounted thereon and the pneumatic pump gas outlet pipe (706), a plurality of pneumatic pump gas inlet pipes (705) are connected to the main gas supply pipe (703) in parallel, and a plurality of pneumatic pump gas outlet pipes (706) are connected to the main gas return pipe (704) in parallel; and a number of reversible pneumatic pumps (701) run in parallel through both the main gas supply pipe (703) and the main gas return pipe (704).

10. The bi-directional contra-rotating circular-rail bearing Y-shaped compound blade fluid energy collection multi-unit power generating windmill according to claim 9, characterized in that, for the pneumatic energy collection multi-unit power generating systems (7), three inner circles of the circular-rail windmill of each pneumatic energy collection multi-unit power generating system (7) use a set of main gas supply pipe (703) and main gas return pipe (704) to circulate gas, while three outer circles of the circular-rail windmill uses another set of main gas supply pipe (703) and main gas return pipe (704) to circulate gas; and, the remote automatic windmill control system (1) controls the on/off of the main gas pipe valve to perform switchover between high-pressure gas circulation and low-pressure gas circulation, so as to switch the reversible pneumatic pumps (701) on the three inner circles of the circular-rail windmill or on the three outer circles of the circular-rail windmill for purpose of outputting power or providing power.

11. The bi-directional contra-rotating circular-rail bearing Y-shaped compound blade fluid energy collection multi-unit power generating windmill according to claim 9, characterized in that, the gear (404) on each vertical shaft of the circular windmill rail (4) is connected to a reversible hydraulic pump (601) (or a reversible pneumatic pump (701)) on the ground through the vertical shaft (406), the relative orientation of the moving circular-rail windmill body (3) and the fixed circular-rail windmill rail (4) is measured by providing an orientation measurement sensor; then, according to information from the orientation measurement sensor, the remote automatic windmill control system (1) controls the connection or disconnection of the gear (404) on the vertical shaft with or from the clutch device (407) on the vertical shaft (406) between the reversible pneumatic pumps (701), and controls the on/off of the gas pipe valves (707) of the reversible pneumatic pumps (701), the pneumatic pump gas inlet pipe (705) and the pneumatic pump gas outlet pipe (706), so as to adjust the number of the reversible pneumatic pumps (701) operating in parallel, so that the resistance or impetus of each circle of the circular-rail windmill body (3) is adjusted.

12. The bi-directional contra-rotating circular-rail bearing Y-shaped compound blade fluid energy collection multi-unit power generating windmill according to claim 9, characterized in that, for the pneumatic energy collection multi-unit power generating systems (7), when the pressure of the high-pressure gas tank (713) reaches a specified value, the motor gas pipe valve (714) is controlled to be turned on by the remote automatic windmill control system (1) to allow high-pressure gas to quickly flow to the gas wheel generator set (709); the gas wheel generator set (709) is connected with multiple intelligent combinations in series and in parallel and can accomplish different power output processes of the generators; a pneumatic adjustment valve (702) capable of exchanging with the outside gas is provided on the low-pressure gas tank (712); when the gas pressure in the tank is lower the outside pressure, the pneumatic adjustment valve (702) is automatically turned on for air inflow; when the gas pressure in the tank reaches or is higher than the outside pressure, the pneumatic adjustment valve is automatically turned off, so that the gas is circulated in a closed manner and remains higher than a certain pressure of the outside; and, the pneumatic energy collection multi-unit power generating systems (7) convert dynamic pressure energy in the energy circulating system device into electric energy, and the electric energy is then merged into the power grid by a power transmission cable (617).

13. The bi-directional contra-rotating circular-rail bearing Y-shaped compound blade fluid energy collection multi-unit power generating windmill according to claim 1, characterized in that the circular cable pulling vehicle rail has: an upper wheel groove (502) and a lower rail (501) on one side thereof, a middle wheel groove (503) in the middle portion of an upper face thereof, and a side driving gear (508) and a side auxiliary driving circular wheel (509) in the interior thereof; and an upper support wheel (505), a lower support wheel (506) and a horizontal support wheel (507) are mounted on the cable pulling cable vehicle side rail (504), wherein:

a rack fixing groove is provided on the outer side of the cable pulling cable vehicle side rail (504) to be meshed with the side driving gear (508); a flat rail is provided on the inner side of the cable pulling vehicle side rail to be engaged with the side auxiliary driving circular wheel (509), so that the cable pulling cable vehicle side rail (504) is engaged with the side driving gear (508) and the side auxiliary driving circular wheel (509) without any gap;

the upper wheel groove (502) is rested on the top of the upper support wheel (505) of the circular-rail one-piece cable pulling vehicle, the lower rail (501) is pressed under the lower support wheel (506), the middle wheel groove (503) is flatly pressed under the horizontal support wheel (507), and a central shaft of the horizontal support wheel is vertically mounted on the cable pulling vehicle side rail (504); and a stay cable (209) is mounted at the upper part of the central shaft of the horizontal support wheel, and the circular-rail one-piece cable pulling vehicles (5) are connected to the Y-shaped compound blades (2) in the middle through the stay cable (209), so that the circular-rail one-piece cable pulling vehicles (5) can bear the pulling force of the stay cable (209) and always run along the circular cable pulling vehicle rail; and the side driving gear (508) and the side auxiliary driving circular wheel (509) are equidistantly arranged on the circular cable pulling vehicle rail, and the side driving gear (508) drives the circular-rail one-piece cable pulling vehicles (5) to rotate;

the circular-rail one-piece cable pulling vehicles (5) are connected end to end; controllable moving joints are provided at two or four equal-division points of the circumference so that the perimeter of the circular-rail one-piece cable pulling vehicles (5) remains unchanged after thermal expansion and cold contraction.

14. The bi-directional contra-rotating circular-rail bearing Y-shaped compound blade fluid energy collection multi-unit power generating windmill according to claim 1, characterized in that, with respect to a wind-tracing direction adjustment technical method of Y-shaped compound blades borne by the circular-rail, during determining wind direction, time spans, in which the compound blade surfaces of the Y-shaped compound blades can generate the revolution effect, among the time spans of the circular-rail windmill are determined; in the time spans in which the compound blade surfaces can generate the revolution effect, by adjusting by an individual blade wind-tracing direction adjustment device, the blade surfaces of the individual blades are allowed to cover the grid framework (204) of the compound blade surfaces in parallel, so that the compound blade surfaces of the compound blades become a wind-tight wall for generating the revolution effect; in the time spans in which the compound blade surfaces cannot generate the revolution effect, through the individual blade wind-tracing direction adjustment device, the individual blades rotate, the individual blades are adjusted to an optimal wind-receiving angle capable of generating the revolution effect, and then the individual blades rotate in an opposite direction at a rotation speed ratio of 1:2 with the revolution of the windmill so as to maintain the optimal wind-receiving angle; in case of strong wind, through the individual blade wind-tracing direction adjustment device, blade surfaces of higher layers of individual blades of the compound blades are adjusted to be parallel to the wind direction, the rotation speed ratio of the rotation of the individual blades to the revolution of the windmill is adjusted to be 1:1, and the rotation direction is opposite, so that the blade surfaces of higher layers of individual blades are always parallel to the wind direction and resist the wind at a minimum area; if the wind is stronger, and the larger number of layers of upper individual blades resisting wind at the minimum area will be adjusted; when only the lowest layer of individual blades resist wind, the wind-receiving area of the blade surfaces will be reduced to several tenths of the normal wind-receiving area; and, if the blade surfaces of all the individual blades are parallel to the wind direction, the windmill stops acting to withstand the ultra-strong wind.

15. The bi-directional contra-rotating circular-rail bearing Y-shaped compound blade fluid energy collection multi-unit power generating windmill according to claim 1, characterized in that the remote automatic windmill control system (1) comprises a windmill operation automated hardware environment consisting of an information core component, information collection and sensing components and an information command execution component, and a windmill management program software environment, wherein:

the information core component is a computer in which all management programs of the whole windmill operate, the computer can send an execution command or a command of accessing and collecting related information to interface circuits of all information components by using the windmill management programs, and an information interface of the computer is also connected to an external network in order to share internal and external information resources and perform remote uniform management;

the information collection and sensing components are information sources of the computer; various information collection and sensing components can measure wind direction, wind speed, temperature, motor rotation speed and power, the rotation angle of each layer of individual blades, the relative orientation of each circle of the circular-rail windmill body (3) and the circular windmill rail (4) when the windmill performs revolution, and the relative orientation of the circular-rail one-piece cable pulling vehicles (5) and the circular-rail windmill; these information sensing components provide useful data for the computer constantly; and each information sensing component has an information processing circuit with a certain ability and a set of complete information interface circuits;

the information command execution component mainly involves: clutch switching-on/off and transmission ratio control of the variable-speed regulation motor device (21110) in the wind-tracing direction adjustment device mounted between the individual blades, startup or turning-off of the servo motor, connection or disconnection of the clutch device (407) mounted on the vertical shaft (406), on/off of valves of the reversible hydraulic pumps (601) with the hydraulic pump water inlet pipe (602) and the hydraulic pump water outlet pipe (603), on/off of the gas pipe valve (707) of the reversible pneumatic pumps (701) with the pneumatic pump gas inlet pipe (705) and the pneumatic pump gas outlet pipe (706), adjustment of the total number of the reversible hydraulic pumps/pneumatic pumps operating in parallel, connection of multiple intelligent combinations to the water/gas wheel generator set in series and in parallel, adjustment of power output processes of the generators, operation of the circular-rail one-piece cable pulling vehicles (5), adjustment of the driving force transferred to the side driving gear (508) by the hydraulic motor and the servo motor and the transmission ratio, and adjustment of connection at the controllable moving joints of the circular-rail one-piece cable pulling vehicles (5); for various action executions, a large amount of facilities such as electronic switches, electromagnetic switches and servo motors are utilized, which are extensions of the "hand" of the computer; and the three information facilities, i.e., the information core, information sensing and information execution components, form the automated hardware environment required for the operation of the windmill; and the windmill management program software environment runs in the computer and is divided into five subprograms: a self-check program of the windmill, a startup wind collection and reset program of the windmill, a multi-circumstance wind collection program of the windmill, a wind collection stopping program of the windmill and a fault-protection stopping program of the windmill; as long as the conditions for entering a certain subprogram are met, the computer can enter the running state of this program; and, the whole management of the windmill is a process in which the five subprograms are flexibly switched and operated according to respective multiple conditions and setup parameters.

* * * * *